United States Patent
Qasaimeh et al.

(10) Patent No.: US 11,815,527 B2
(45) Date of Patent: Nov. 14, 2023

(54) 3D MULTIPURPOSE SCANNING MICROSCOPY PROBES

(71) Applicant: New York University in Abu Dhabi Corporation, Abu Dhabi (AE)

(72) Inventors: Mohammad A. Qasaimeh, Abu Dhabi (AE); Ayoub Glia, Abu Dhabi (AE)

(73) Assignee: NEW YORK UNIVERSITY, New York, NY (US)

( * ) Notice: Subject to any disclaimer, the term of this patent is extended or adjusted under 35 U.S.C. 154(b) by 0 days.

(21) Appl. No.: 17/520,318

(22) Filed: Nov. 5, 2021

(65) Prior Publication Data

US 2022/0146549 A1 May 12, 2022

Related U.S. Application Data

(60) Provisional application No. 63/164,134, filed on Mar. 22, 2021, provisional application No. 63/110,710, filed on Nov. 6, 2020.

(51) Int. Cl.
*G01Q 60/38* (2010.01)
*G01Q 20/02* (2010.01)

(52) U.S. Cl.
CPC .......... *G01Q 60/38* (2013.01); *G01Q 20/02* (2013.01)

(58) Field of Classification Search
CPC ............... G01Q 60/38; G01Q 20/02
USPC .......................................... 850/21
See application file for complete search history.

(56) References Cited

U.S. PATENT DOCUMENTS

| | | | |
|---|---|---|---|
| 2021/0123948 A1* | 4/2021 | Brown | G01Q 30/04 |
| 2021/0396783 A1* | 12/2021 | Lal | G01Q 60/40 |
| 2022/0155344 A1* | 5/2022 | Crippa | B28B 1/001 |

OTHER PUBLICATIONS

Albrecht, T.R. and C.F. Quate, Atomic resolution imaging of a nonconductor by atomic force microscopy. Journal of Applied Physics, 1987. 62(7): pp. 2599-2602.

(Continued)

*Primary Examiner* — Nicole M Ippolito
(74) *Attorney, Agent, or Firm* — Riverside Law LLP

(57) ABSTRACT

Disclosed is a multipurpose scanning microscopy probe comprising a probe holder, a cantilever connected to the probe holder, and a probe tip connected to the cantilever, wherein the probe tip is a three-dimensional geometry, and wherein the probe tip is a 3D printed part. In some embodiments the probe is made from SU8 epoxy-based resin. In some embodiments the probe is made from a combination of SU8 and nanomaterial such as carbon nanotubes. In some embodiments the probe includes cavities and voids. In some embodies the probe includes fluidic features and elements. Scanning microscopy probe methods are also disclosed.

20 Claims, 41 Drawing Sheets
(25 of 41 Drawing Sheet(s) Filed in Color)

(56) References Cited

OTHER PUBLICATIONS

Binnig, G. and H. Rohrer, Scanning tunneling microscopy—from birth to adolescence. reviews of modern physics, 1987. 59(3): p. 615.

Binnig, G., C.F. Quate, and C. Gerber, Atomic Force Microscope. Physical Review Letters, 1986. 56(9): pp. 930-933.

Binnig, G., et al., 7 x 7 Reconstruction on Si(111) Resolved in Real Space. Physical Review Letters, 1983. 50(2): pp. 120-123.

Binnig, G., et al., Atomic Resolution with Atomic Force Microscope. Europhysics Letters (EPL), 1987. 3(12): pp. 1281-1286.

Binnig, G., et al., Surface studies by scanning tunneling microscopy. Physical review letters, 1982. 49(1): p. 57.

Butt, H.-J., B. Cappella, and M. Kappl, Force measurements with the atomic force microscope: Technique, interpretation and applications. Surface science reports, 2005. 59(1-6): pp. 1-152.

Deepu, B.R., U.N. Bhatt, and P. Savitha. An analysis of wet anisotropic etching based bulk micromachining for the fabrication of Si tips. in 2016 3rd International Conference on Emerging Electronics (ICEE). 2016.

Dimitriadis, E.K., et al., Determination of elastic moduli of thin layers of soft material using the atomic force microscope. Biophysical journal, 2002. 82(5): pp. 2798-2810.

Faria, E.C., et al., Measurement of elastic properties of prostate cancer cells using AFM. Analyst, 2008. 133(11): pp. 1498-1500.

Garcia, R., et al., Dynamic atomic force microscopy methods. Surface science reports, 2002. 47(6-8): pp. 197-301.

Giessibl, F.J., Advances in atomic force microscopy. Reviews of modern physics, 2003. 75(3): p. 949.

Giessibl, F.J., AFM's path to atomic resolution. Materials Today, 2005. 8(5): pp. 32-41.

Hamaker, H., The London—van der Waals attraction between spherical particles. physica, 1937. 4(10): pp. 1058-1072.

Haviland, D.B., Quantitative force microscopy from a dynamic point of view. Current Opinion in Colloid & Interface Science, 2017. 27: pp. 74-81.

Ikai, A., STM and AFM of bio/organic molecules and structures. Surface Science Reports, 1996. 26(8): pp. 261-332.

Israelachvili, J.N., Intermolecular and surface forces. 2011: Academic press.

Kogure, T., Investigations of micas using advanced transmission electron microscopy. Reviews in mineralogy and geochemistry, 2002. 46(1): pp. 281-312.

Meyer, G. and N.M. Amer, Optical-beam-deflection atomic force microscopy: The NaCl (001) surface. Applied Physics Letters, 1990. 56(21): pp. 2100-2101.

Randall, J.N., et al., Atomically Precise Manufacturing: The Opportunity, Challenges, and Impact, in Atomic Scale Interconnection Machines. 2012, Springer. pp. 89-106.

Sokolov, I., Atomic force microscopy in cancer cell research. Cancer nanotechnology, 2007. 1: p. 1-.

Zhou, X., Y. Hou, and J. Lin, A review on the processing accuracy of two-photon polymerization. AIP Advances, 2015. 5(3): p. 030701.

* cited by examiner

Cantilever Specifications

| | |
|---|---|
| Spring k (N/m) | (0.1 – 5) |
| Freq (kHz) | (58 – 78) |
| Length (μm) | (200 – 205) |
| Width (μm) | (29 - 32) |
| Thickness (μm) | (3 - 11) |
| Shape | rectangular |
| Material | SU8 |
| Reflex Coating (nm) | Au (150 – 200) |

Tip Specifications

| | |
|---|---|
| Tip radius (nm) | (20 – 100) |
| Tip height (μm) | 50 +/- 5 |
| Tip Base (μm) | 10, 15, 20 |
| Front angle (°) | 8, 10, 15 +/- 0.5 |
| Back angle (°) | 8, 10, 15 +/- 0.5 |
| Tip shape | cone |
| Tip material | SU8 |
| Tip coating (nm) | None |

Figure 6

Cantilever Specifications

| | |
|---|---|
| Spring k (N/m) | (0.1 – 5) |
| Freq (kHz) | (62 – 78) |
| Length (μm) | (200 – 205) |
| Width (μm) | (29 – 32) |
| Thickness (μm) | (6 – 25) |
| Shape | rectangular |
| Material | SU8 |
| Reflex Coating (nm) | Au (150 – 200) |

Tip Specifications

| | |
|---|---|
| Tip radius (nm) | (6.25) CNT radius |
| Tip height (μm) | 53 +/- 5 |
| Tip Base (μm) | 10, 15, 20 |
| Front angle (°) | 8, 10, 15 +/- 0.5 |
| Back angle (°) | 8, 10, 15 +/- 0.5 |
| Tip shape | cone |
| Tip material | SWCNT |
| Tip coating (nm) | None |

Figure 8

| Cantilever Specifications | |
|---|---|
| Spring k (N/m) | (0.1 – 5) |
| Freq (kHz) | (62 – 78) |
| Length (µm) | (200 – 205) |
| Width (µm) | (29 – 32) |
| Thickness (µm) | (6 – 25) |
| Shape | rectangular |
| Material | SU8 |
| Reflex Coating (nm) | Au (150 – 200) |

| Tip Specifications | |
|---|---|
| Tip radius (nm) | (10-20) |
| Tip height (µm) | 53 +/- 5 |
| Tip Base (µm) | 10, 15, 20 |
| Front angle (°) | 8, 10, 15 +/- 0.5 |
| Back angle (°) | 8, 10, 15 +/- 0.5 |
| Tip shape | cone |
| Tip material | SU8 |
| Tip coating (nm) | None |

Figure 10

Cantilever Specifications

| | |
|---|---|
| Spring k (N/m) | (0.1 – 5) |
| Freq (kHz) | NA |
| Length (μm) | (200 – 205) |
| Width (μm) | (29 - 32) |
| Thickness (μm) | (6 - 25) |
| Shape | rectangular |
| Material | SU8 |
| Reflex Coating (nm) | Au (150 – 200) |

Tip Specifications

| | |
|---|---|
| Tip length (μm) | 350 |
| Tip base Diameter (μm) | 10, 40 |
| Tip angle (°) | 0, 8 |
| Tip end radius (μm) | 5, 0.1 |
| Edge thickness (μm) | NA |
| Tip shape | Cylinder, cone |
| Tip material | SU8 |
| Tip coating (nm) | None |

Figure 15

| Cantilever Specifications | |
|---|---|
| Spring k (N/m) | (0.1 – 5) |
| Freq (kHz) | (62 – 78) |
| Length (μm) | (200 – 205) |
| Width (μm) | (29 – 32) |
| Thickness (μm) | (6 – 25) |
| Shape | rectangular |
| Material | SU8 |
| Reflex Coating (nm) | Au (150 – 200) |

| Tip Specifications | |
|---|---|
| Shovel height (μm) | 55 |
| Shovel width (μm) | 80 |
| Shovel thickness (μm) | 20 |
| Shovel Length (μm) | 75 |
| Edge thickness (μm) | 3 |
| Tip shape | Shovel (sharp end) |
| Tip material | SU8 |
| Tip coating (nm) | None |

Figure 18

| Cantilever Specifications | |
|---|---|
| Spring k (N/m) | (0.1 – 5) |
| Freq (kHz) | (62 – 78) |
| Length (μm) | (200 – 205) |
| Width (μm) | (29 – 32) |
| Thickness (μm) | (6 - 25) |
| Shape | rectangular |
| Material | SU8 |
| Reflex Coating (nm) | Au (150 – 200) |

| Tip Specifications | |
|---|---|
| Cap Diameter (μm) | 10 - 32 |
| Block length (μm) | 55 |
| Block width (μm) | 75 |
| Block thickness (μm) | 25 |
| Back angle (°) | NA |
| Tip shape | Hemi-spherical cavity |
| Tip material | SU8 |
| Tip coating (nm) | None |

Figure 22

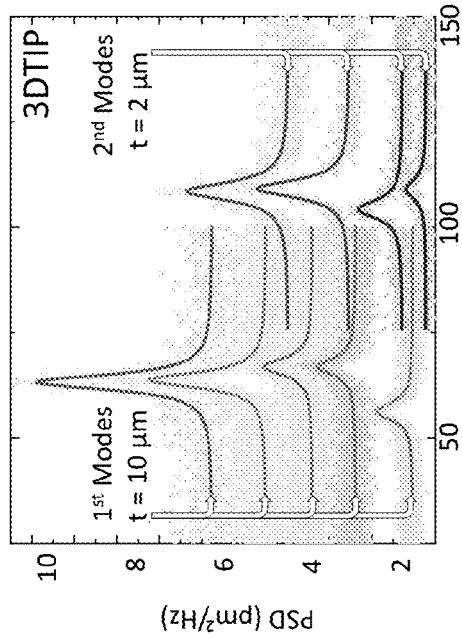
Figure 30E
Figure 30F
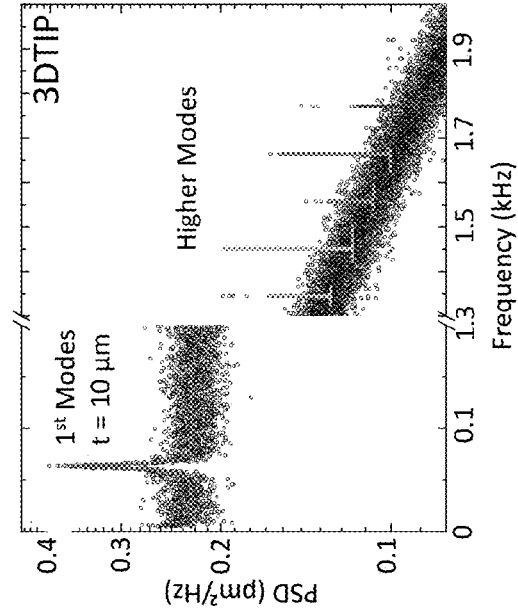
Figure 30G
Figure 30H
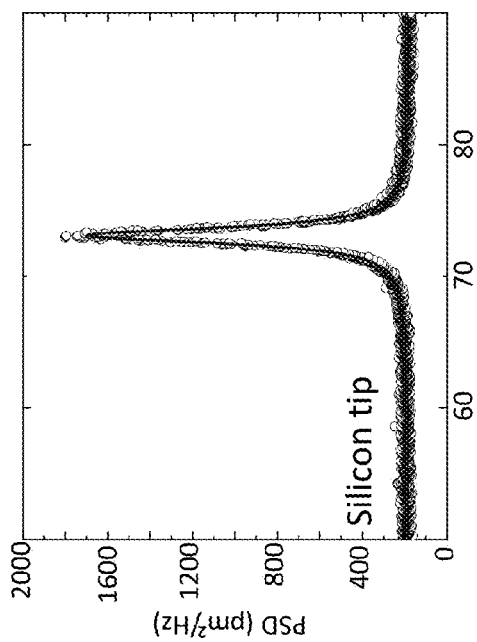

3D MULTIPURPOSE SCANNING MICROSCOPY PROBES

CROSS-REFERENCE TO RELATED APPLICATIONS

This application claims priority to U.S. provisional application No. 63/110,710 filed on Nov. 6, 2020, and to U.S. provisional application No. 63/164,134 filed on Mar. 22, 2021, each incorporated herein by reference in their entirety.

BACKGROUND

Scanning microscopy probes have evolved as a very important scientific tools in the fields of imaging, mechanical testing, and bio-sensing at the nanoscale. Example applications of scanning microscopy probes include atomic force microscopy (AFM) probes, profilometers, and nanoindentors. Current scanning microscopy probe technology utilizes metallic, silicon, or other materials for probe tips. However, these tips can be fragile, can have high wearability, can be difficult to produce, are expensive, and can only be made in limited geometries. For example, the tips of AFM probes are commonly made out of silicon using traditional micromachining procedures, and are fragile, have high wearability, are expensive, and can be produced in limited geometries. Thus, there is a need in the art for improved scanning microscopy probes.

SUMMARY

Some embodiments of the invention disclosed herein are set forth below, and any combination of these embodiments (or portions thereof) may be made to define another embodiment.

In one aspect a multipurpose scanning microscopy probe comprises a probe holder, a cantilever connected to the probe holder, and a probe tip connected to the cantilever, wherein the probe tip is a three-dimensional geometry, and wherein the probe tip is a 3D printed part. In some embodiments, the probe holder comprises at least one cantilever and one tip. In some embodiments, the scanning probe comprises multiple holders, or multiple cantilevers, or multiple tips, or any combination of multiple holders, multiple cantilevers and multiple tips. In some embodiments, the probe holder and the cantilever are produced using additive manufacturing techniques. In some embodiments, the probe holder and the cantilever are 3D printed parts. In some embodiments, the probe holder, the cantilever, and the probe tip are 3D printed as a single part. In some embodiments, the probe holder, the cantilever, and the probe tip are 3D printed as separate parts. In some embodiments, the probe is made from SU8 epoxy-based resin. In some embodiments, the probe is made from photoresist. In some embodiments the probe is made from polymeric material.

In some embodiments, the probe is made from a combination of SU8 and a nanomaterial. In some embodiments, the nanomaterial is at least one of carbon nanotubes, nanorods, biomolecules, and nanoparticles. In some embodiments, the nanomaterial is embedded in the probe tip.

In some embodiments, the probe is made from a combination of photoresist and a nanomaterial. In some embodiments, the nanomaterial is at least one of carbon nanotubes, nanorods, biomolecules, and nanoparticles. In some embodiments, the nanomaterial is embedded in the probe tip.

In some embodiments, the probe tip is post-processed with a focused ion beam. In some embodiments, the probe tip is post-processed with a reactive ion etching. In some embodiments, the probe tip is post-processed with a chemical vapor deposition. In some embodiments, the probe tip is post-processed with a sputtering. In some embodiments, the probe tip is conical. In some embodiments, the probe tip is a spring. In some embodiments, the probe tip has a high aspect ratio. In some embodiments, the probe tip is spherical. In some embodiments, the probe tip is cylindrical. In some embodiments, the probe tip includes a flat element. In some embodiments, the probe tip includes a hemispherical cavity. In some embodiments, the probe tip is hooked shaped. In some embodiments, the probe tip is shovel shaped. In some embodiments, the probe tip is colloidally shaped. In some embodiments, the probe is at least one of a conical, a spring, a high aspect ratio, a spherical, a cylindrical, a flat, a dimple, a hooked, a shovel, and a colloidal shape. In some embodiments, the probe design is a custom design for high-speed AFM imaging.

In some embodiments, the probe includes cavities and voids. In some embodiments, the probe includes channels, chambers, or filters. In some embodiments, the probe includes microfluidic components. In some embodiments, the probe includes fluidic elements. In some embodiments, the probe includes fluidic elements ranging from the meso to the nano scale. In some embodiments, the probe tip includes at least one aperture and at least one fluidic element. In some embodiments, the at least one aperture is at least one of a circular shape, an oval shape, a rectangular shape, and a crescent shape.

In some embodiments, the probe tip includes at least one aperture and at least one fluidic element, wherein the at least fluidic element comprises at least one shape selected from the group consisting of a mesofluidic channel, a microfluidic channel, a nanofluidic channel, a straight channel, a serpentine channel, a filter, a chamber, a shape varying fluidic element, a 3D fluidic element, and a cross-sectional shape varying fluidic element, and wherein the at least one aperture comprises at least one shape selected from the group consisting of a circular shape, an oval shape, a rectangular shape, and a crescent shape. In some embodiments, the cantilever is at least one of a T-shape, a rectangular shape, and L-shape, a trapezoidal shape, a variable-width shape, a triangular shape, and a variable cross-sectional shape. In some embodiments, the variable cross-sectional shape is at least one of a rectangular shape, a trapezoidal shape, a triangular shape, and a curved shape. In some embodiments, the cantilever is configured to accept at least one probe tip of varying shapes. In some embodiments, the probe is coated with a layer of at least one of a metal, a polymer, and a biological material.

In another aspect, multipurpose scanning microscopy probe production method comprises providing a 3D printed scanning microscopy probe design, and 3D printing a scanning microscopy probe. In some embodiments, the method further comprises 3D printing the probe from SU8 epoxy-based resin. In some embodiments, the method further comprises 3D printing the probe from other photoresist. In some embodiments, the method further comprises dipping the probe into a nanomaterial population to embed the nanomaterial in the probe. In some embodiments, the method further comprises dipping the probe into a nanomaterial population to embed the nanomaterial in the probe while the probe is in a semi-cured state. In some embodiments, the nanomaterial is introduced during the additive manufacturing process. In some embodiment the nanomaterial is homogeneously mixed with the photoresist before 3D printing. In some embodiments, the probe is 3D printed using 2-photon 3D printing. In some embodiments, the probe design is a custom design. In some embodiments, the probe design includes at least one aperture and at least one fluidic element. In some embodiments the method further comprises post-processing the probe with a focused ion beam. In some embodiments the method further comprises post-processing the probe with a reactive ion etching. In some embodiments, the probe tip is post-processed with a chemical vapor deposition. In some embodiments, the probe tip is post-processed with a sputtering.

In another aspect a microscopy method comprises providing a 3D printed scanning microscopy probe, and performing a scanning microscopy operation with the 3D printed probe, wherein the scanning microscopy operation includes at least one of scanning probe microscopy (SPM), atomic force microscopy (AFM), profilometry, nanoindentation, nano-injection/aspiration, nano/micro-manipulation, and nano/micro-fluidic sampling.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing purposes and features, as well as other purposes and features, will become apparent with reference to the description and accompanying figures below, which are included to provide an understanding of the invention and constitute a part of the specification, in which like numerals represent like elements, and in which:

FIG. 6 depicts a table of specifications for an example probe in accordance with some embodiments.

FIG. 8 depicts a table of specifications for an example probe in accordance with some embodiments.

FIG. 10 depicts a table of specifications for an example probe in accordance with some embodiments.

FIG. 15 depicts a table of specifications for an example probe in accordance with some embodiments.

FIG. 18 depicts a table of specifications for an example probe in accordance with some embodiments.

FIG. 22 depicts a table of specifications for an example probe in accordance with some embodiments.

FIGS. 30A-30H depict simulated and experimental performance of an example probe in accordance with some embodiments.

DETAILED DESCRIPTION OF THE INVENTION

Figure 1:
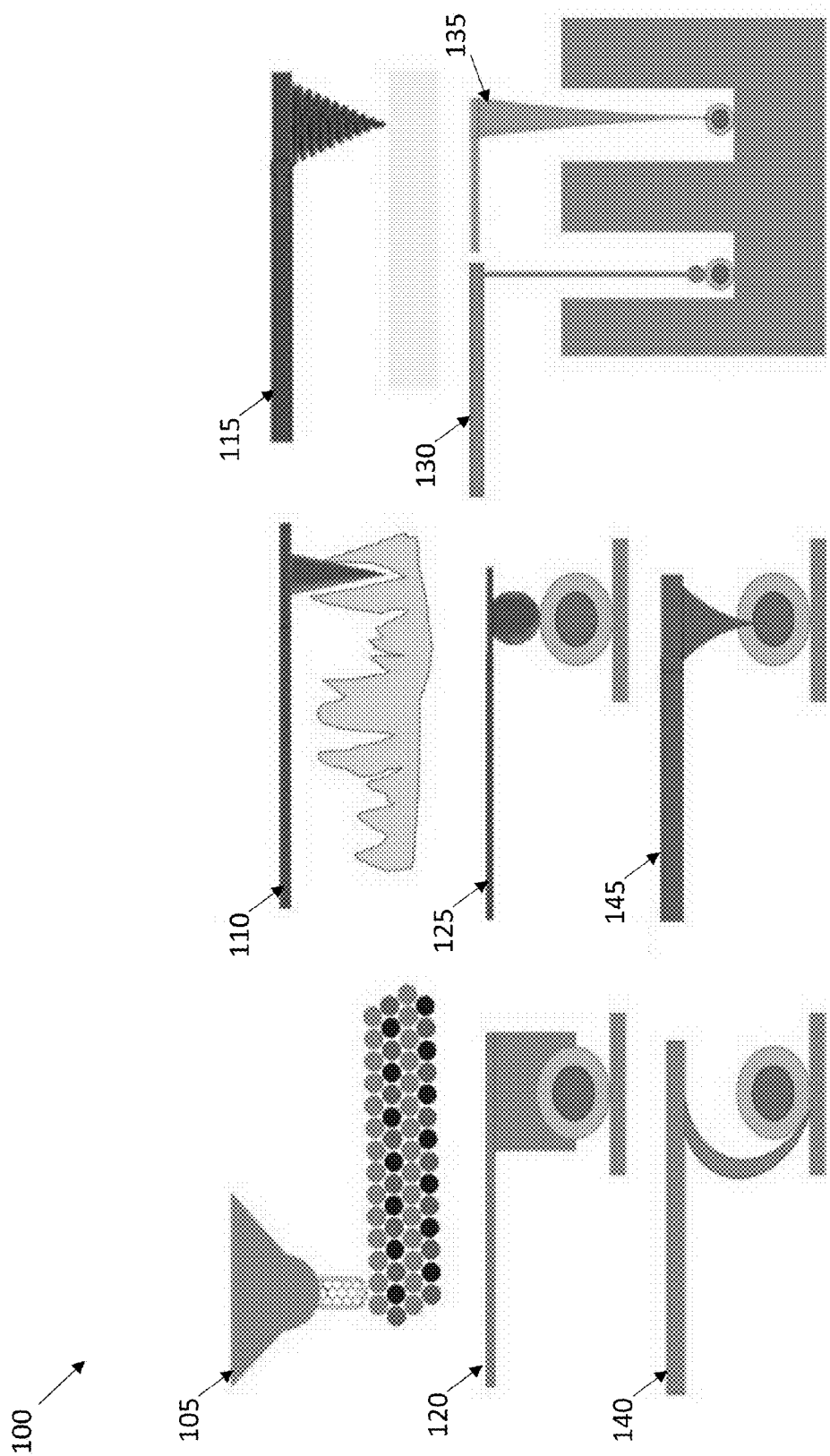
FIG. 1 depicts example 3D printed probe designs in accordance with some embodiments.

It is to be understood that the figures and descriptions of the present invention have been simplified to illustrate elements that are relevant for a clearer comprehension of the present invention, while eliminating, for the purpose of clarity, many other elements found in systems and methods of 3D printed multipurpose scanning microscopy probes. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein are 3D printed multipurpose scanning microscopy probes.

Disclosed are multifunctional probes for scanning microscopy. In some embodiments, the probes comprise an epoxy-based resin, such as SU8. In some embodiments, the probes comprise carbon nanotubes (CNT). In some embodiments, the probes comprise an epoxy-based resin, such as SU8, and carbon nanotubes (CNT). In some embodiments, the probes comprise photosensitive resins such as the conventionally used photoresists in photolithography protocols. In some embodiments, the probes comprise photosensitive resins and carbon nanotubes (CNT) or other nanomaterials. The mixing SU8 and/or photoresist with CNTs in the production of probe tips provides for a probe with a single, far-reaching CNT at its end. This significantly enhances the vertical resolution due to the high aspect ratio of the CNT, as well as the lateral resolution due to the thickness of the CNT. In some embodiments, these probes are manufactured using commercial two-photon polymerization (TPP) 3D printer. The developed probes are more versatile than the conventional silicon-based counterparts, can achieve atomic resolution in ambient conditions, and can be manufactured in several unique shapes and features that cannot be realized with other methods.

Two photon Polymerization (TPP):

TPP has emerged recently as a powerful technology with the potential of printing true three-dimensional structure at the sub-micrometer scale with a sub diffraction-limit resolution. It has been tested with various materials and applied to electronics, communication, microfluidics, MEMS, and now in this invention it is to be explored in scanning microscopy probe use in biomedicine.

The photo chemical process of TPP comprise of three main steps: initiation process, propagation process, and termination process. In the initiation process, a femtosecond laser beam is focused tightly into a volume of the photosensitive resins, which initiated the TPP photochemical process. Photoinitiators (PIs) reach the excited state (PI*) by absorption of two photons and decompose to radicals (R.). In the propagation process, the radicals combine with monomers (M) to produce monomer radicals (RMn). In the termination process, two monomer radicals are combined, and the photo-polymerization process is terminated.

Two photon polymerization (TPP) is used as a 3D printing technique in the making of multifunctional scanning microscopy probes. The developed multifunctional probes resemble the silicon based commercially available probes, are robustly function in all scanning microscopy modes and all environment settings, and can achieve true atomic resolution. In addition, 3D printing can transform scanning microscopy by offering the possibility to produce innovative 3D probe tip materials, geometries, integrated elements, and designs that cannot be obtained by the traditionally used Si probe microfabrication techniques.

Atomic Force Microscopy:

Gerd Binnig and Heinrich Rohrer extended the sense of touching to the nanoscale world by introducing the scanning tunneling microscope (STM). For such a remarkable invention, they were awarded the Nobel Prize in physics in 1986. Furthermore, with a spark of a brilliant idea, they went a step further and introduced atomic force microscopy. Despite the successful breakthrough of STM, it suffers from important limitations. Electrical conduction of the sample is must, since it uses the tunneling current that flows between the tip and the sample. Yet, interestingly, it was observed that at small tip-sample distances, i.e. enough that the current flows, important forces act in parallel with the tunneling current. Remarkably, speculations over such observation were put to work, hence the birth of AFM. Rapidly evolving during the following decade, AFM had already given birth to a multitude of techniques to explore surface topography, nanoscale characterization and manipulation of a wide variety of materials.

High-resolution AFM became possible with the introduction of frequency-modulation AFM (FMAFM), where the AFM cantilever oscillates at a fixed amplitude and information from the frequency shift is used as a feedback signal. When the amplitude of oscillation is reduced to the sub-nanometer range with the use of very stiff cantilevers (quartz), the spatial resolution was significantly increased. Moreover, the direct evaluation of the cantilever higher harmonics has further contributed to the spatial resolution. The advantage of AFM over STM as tool for atomic resolution imaging is that it relies on Van Der Waals forces as a signal without the need of conducting current, thus it can image insulators as well as conductors.

An atomic resolution surface image in real space was first achieved with the STM in 1983, by the reconstruction of 7×7 Si (111). Then, the invention of AFM eventually led to achieving apparent atomic resolution on conductors and insulators. Although the periodic lattice spacing of the imaged samples was observed in these early studies, yet indicators of structure defects, such as single defects and step edges were not present. Accordingly, it was generally assumed that at the tip end there were several atoms interacting with the sample surface instead of a single atom. This general assumption attributes to the difference between the apparent and true atomic resolution. To put this into a macroscopic perspective, imagine a truck with 20 tires, a motorbike with two tires, and a unicycle (one tire) profiling a road filled with staggered speed bumps (resembling atoms) and potholes (resembling single defects). While the 20 tires truck feels only the periodicity of the staggered speed bumps, the motorbike and unicycle will significantly feel the potholes in the road. To this effect, a clear proof of true atomic resolution is the presence of the lattice defects.

A crucial component of the AFM apparatus is the AFM cantilever, where its geometry, size, mechanical, and material properties decide our observables. The fabrication of AFM tip has been pioneered for decades by the silicon micromachining industry. It has brought many opportunities to the field, but also comprised by many limitations. For instance, the conventional 2D micromachining technics comprise a series of lithographic steps that define the 2D patterns, followed by a processing step, addition and removal of material, and mainly restricted by material and geometry. To this effect, there is a 2D fabrication bound limitation on engineering 3D structures that could produce the main parameters of the AFM cantilever, namely the resonance frequency, spring constant, Q factor, and the shape of the interacting tip.

In AFM, sample is approached by a tip, which is fixed on cantilever spring. At a characteristic proximity, the tip and the sample interact through forces, of electromagnetic origin. These forces are distinctively distance dependent, so called long and short range forces, and eventually cause the cantilever to deflect. The short range forces are mainly attributed to Van Der Waals's interactions, which result from fluctuations in the electrical dipole of atoms. Mainly limited to few hundred Angstroms, they are generalized into macroscopic bodies using the Hamaker Approach, and their potential is calculated using Israelachvili. In agreement with Hook's law, the deflection is proportional with the cantilever's spring constant. Accordingly, the force of interaction is frequently recorded by monitoring the cantilever's deflection using an optical system. The latter comprises a laser that is set to point at the end of the cantilever and is calibrated to reflect into the center of a photodiode. A piezoelectric serves as a tool to move the sample with respect to the tip in lateral directions.

Contact Mode:

In contact mode, the deflection of the cantilever is measured and compared to the desired constant deflection by feedback. If the measured deflection is below or above the desired value, depending on the setting, a feedback amplifier induces a voltage change to a piezo that controls either the sample, or the tip movement to readjust the deflection to the desired value. The obtained height image represents the sample morphology. The resolution of these images is classified as vertical and lateral, the vertical resolution depends on the thermal fluctuation of the cantilever and the noise of the detection system.

Dynamic Mode:

In Dynamic mode, the cantilever is excited, and set to resonate at its damped natural frequency; its frequency of free resonance in air, liquid or vacuum. As the tip is approached to the interacting proximity, and so sample contouring is carried out. The amplitude, or frequency of oscillation is modulated and used as a feedback control to recover various parameters i.e. the sample topography, viscoelastic and hysteretic dissipation responses and surface chemistry.

AFM-Based Force Spectroscopy Techniques:

In AFM-based force spectroscopy (FS-AFM), the tip is approached to the sample in the normal direction, i.e. the displacement is vertical rather than lateral in the case of imaging. FS-AFM is similar to imaging in the way that it can be conducted in contact, or better called quasistatic, and dynamic mode. In quasi-static mode the AFM tip is not excited as it approaches the sample until a predefined separation distance (trigger point) is reached, then retracts from it. The deflection of the cantilever is continuously monitored with respect to the tip-sample separation distance, and converted into force-distance curves. During approach, the AFM tip interacts locally, and further indents the sample's surface to a predefined force or distance threshold. The acquired approach-force-distance curves allow a localized analysis of the viscoelastic properties, or response in the case of living cells, in relevance to the study of cancer cells. For example, elasticity, deformation and dissipation mechanisms could be deduced from these curves.

Additionally, 3D printed probes can achieve higher frequency modes compared to Si probes (with effective quality factors), unprecedented spring constants (softer than Si cantilevers), and their key specifications can be customized with a remarkable accuracy. Furthermore, 3D printed AFM probes can be designed in any 3D shape or complex geometry, thus achieving unprecedented aspect ratios, and covering a wide range of spring constants. This makes them innovation driven and cheaper to redesign. In contrast, conventional silicon tips are expensive, brittle, and rely on 2D microfabrication techniques. The material properties, aspect ratio, and the achievable silicon tips shapes pose limitations on AFM applications.

Thus, 3D printed AFM probes are multifunctional and suitable for all AFM modes and for a plurality of experiment types. For example, for a single 3D printed probe with a SU8-CNT AFM tip, contact and dynamic modes are possible in air and liquid environments. They are suitable for probing soft biological materials as well as hard and rough surfaces with minimum wearability in comparison to silicon tips. Furthermore, it is possible to excite more and higher order frequencies than their respective silicon tips, which opens new venues for multi-frequency AFM operation modes.

FIG. 1 shows example tip designs of the scanning microscopy probe 100. In some embodiments the probe 100 includes a tip with CNT 105 at its end for high aspect ratio and high-resolution imaging. In some embodiments the probe 100 includes a high aspect ratio tip 110 for imaging rough surfaces. In some embodiments the probe 100 includes a spring tip 115 to probe ultra-soft samples. In some embodiments the probe 100 includes a cap tip 120 with a cavity for cell compressibility measurements. In some embodiments the probe 100 includes a colloidal tip 125 for cell viscoelastic measurements. In some embodiments, the probe tip includes a flat element. In some embodiments the probe 100 includes a high aspect ratio colloidal tip 130 for cell measurement within microwells. In some embodiments the probe 100 includes a high aspect ratio conical tip 135 for cell measurements within microwells. In some embodiments the probe 100 includes a shovel (hook) tip 140 for cell adhesion measurements. In some embodiments the probe 100 includes a high aspect ratio puncture tip 145 for cell puncture and transfection experiments. In some embodiments, the probe design is a custom design for high-speed AFM imaging. In some embodiments the probe 100 includes at least one fluidic element and at least one aperture for reagent delivery and sampling or biological manipulation. In some embodiments, the probe 100 includes at least one fluidic element comprising at least one shape selected from the group consisting of a mesofluidic channel, a microfluidic channel, a nanofluidic channel, a straight channel, a serpentine channel, a filter, a chamber, a shape varying fluidic element, a 3D fluidic element, and a cross-sectional shape varying fluidic element. In some embodiments, the probe 100 includes cavities and voids. In some embodiments, the probe 100 includes channels, chambers, or filters. In some embodiments, the probe includes microfluidic components. In some embodiments, the probe includes fluidic elements ranging from the meso to the nano scale.

In some embodiments, one or more fluidic elements can be incorporated into the probe. In some embodiments the fluidic element connects to an aperture in the tip of the probe. In some embodiment the aperture is on the side of the tip. In some embodiment the apertures are positioned at strategic positions within the tip, or the cantilever, or the probe, or a combination of the tip, the cantilever and the probe dependent on the application. In some embodiments a plurality of fluidic elements and apertures are included in the probe. In some embodiments, the probe including a fluidic element and aperture is configured to perform fluidic sampling of the sample and/or delivery to the sample.

Figure 5:
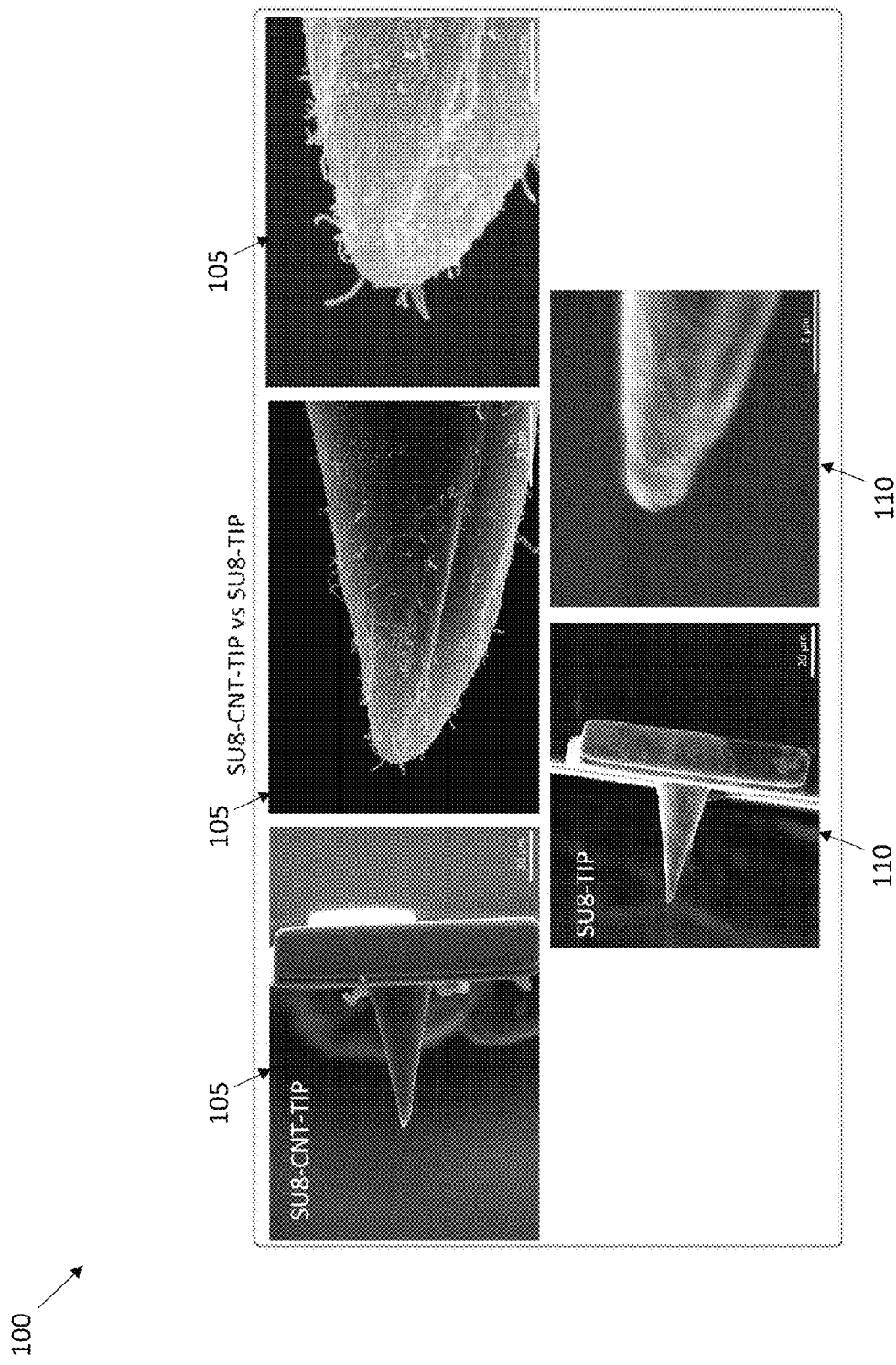
FIG. 5 depicts images of example 3D printed probes in accordance with some embodiments.

In some embodiments, the 3D printed probe tips 105 comprising SU8 and carbon nanotubes are formed by dipping a 3D printed SU8 probe into a carbon nanotube (CNT) population to embed CNTs in the probe tip, see FIG. 5. In some embodiments the SU8 probe is dipped into a carbon nanotube (CNT) population to embed CNTs in the probe tip when the probe in a semi-cured state. In some embodiment the nanomaterial is introduced during the additive manufacturing process. In some embodiment the nanomaterial is homogeneously mixed with the photoresist before 3D printing. In some embodiments, the probe is made from photoresist. In some embodiments, the probe is made from a combination of SU8 and a nanomaterial. In some embodiments, the nanomaterial is at least one of carbon nanotubes, nanorods, biomolecules, and nanoparticles. In some embodiments, the nanomaterial is embedded in the probe tip. In some embodiments, the probe holder, the cantilever, and the probe tip are 3D printed as single or separate parts and consequently assembled with other materials and other components. In some embodiments, the probe holder comprises at least one cantilever and one tip. In some embodiments, the scanning probe comprises multiple holders, or multiple cantilevers, or multiple tips, or any combination of multiple holders, multiple cantilevers and multiple tips. In some embodiments, the probe holder and the cantilever are produced using additive manufacturing techniques.

Figure 2:
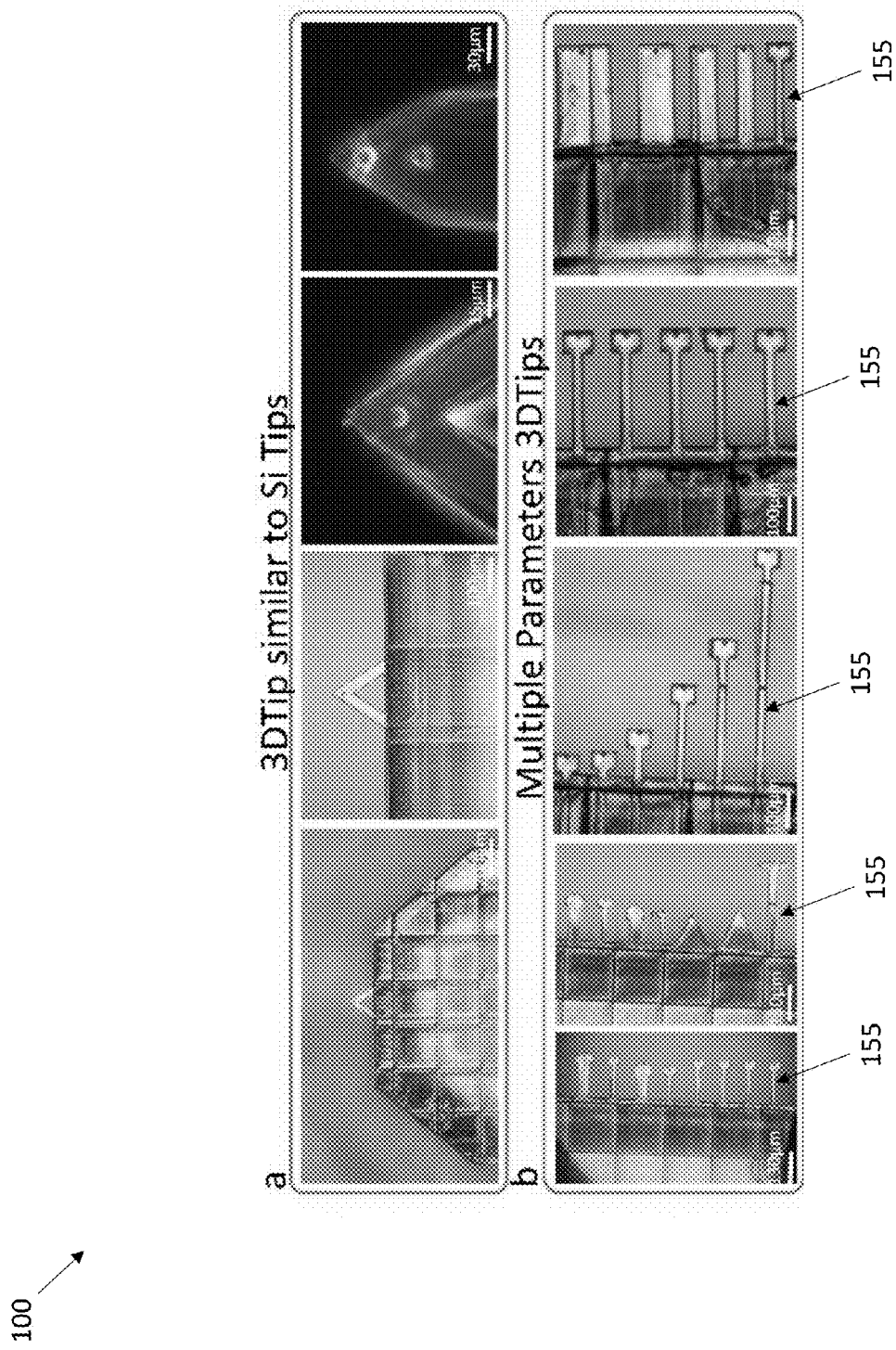
FIG. 2 depicts images of example 3D printed probes in accordance with some embodiments.

FIG. 2 shows optical microscopy images of 3D printed probes 100 that resemble commercially available Si probes in section A, and shows optical microscopy images of probes 100 with cantilevers of varying lengths, thicknesses, and widths in section B. The cantilevers 155 can be produced in various sizes and shapes to fine tune its properties for specific use cases. In some embodiments, the cantilever is at least one of a T-shape, a rectangular shape, and L-shape, a trapezoidal shape, a variable-width shape, a triangular shape, and a variable cross-sectional shape. In some embodiments, the variable cross-sectional shape is at least one of a rectangular shape, a trapezoidal shape, a triangular shape, and a curved shape. In some embodiments, the cantilever is configured to accept at least one probe tip of varying shapes. In some embodiments, the probe is coated with a layer of at least one of a metal, a polymer, and a biological material.

Figure 3:
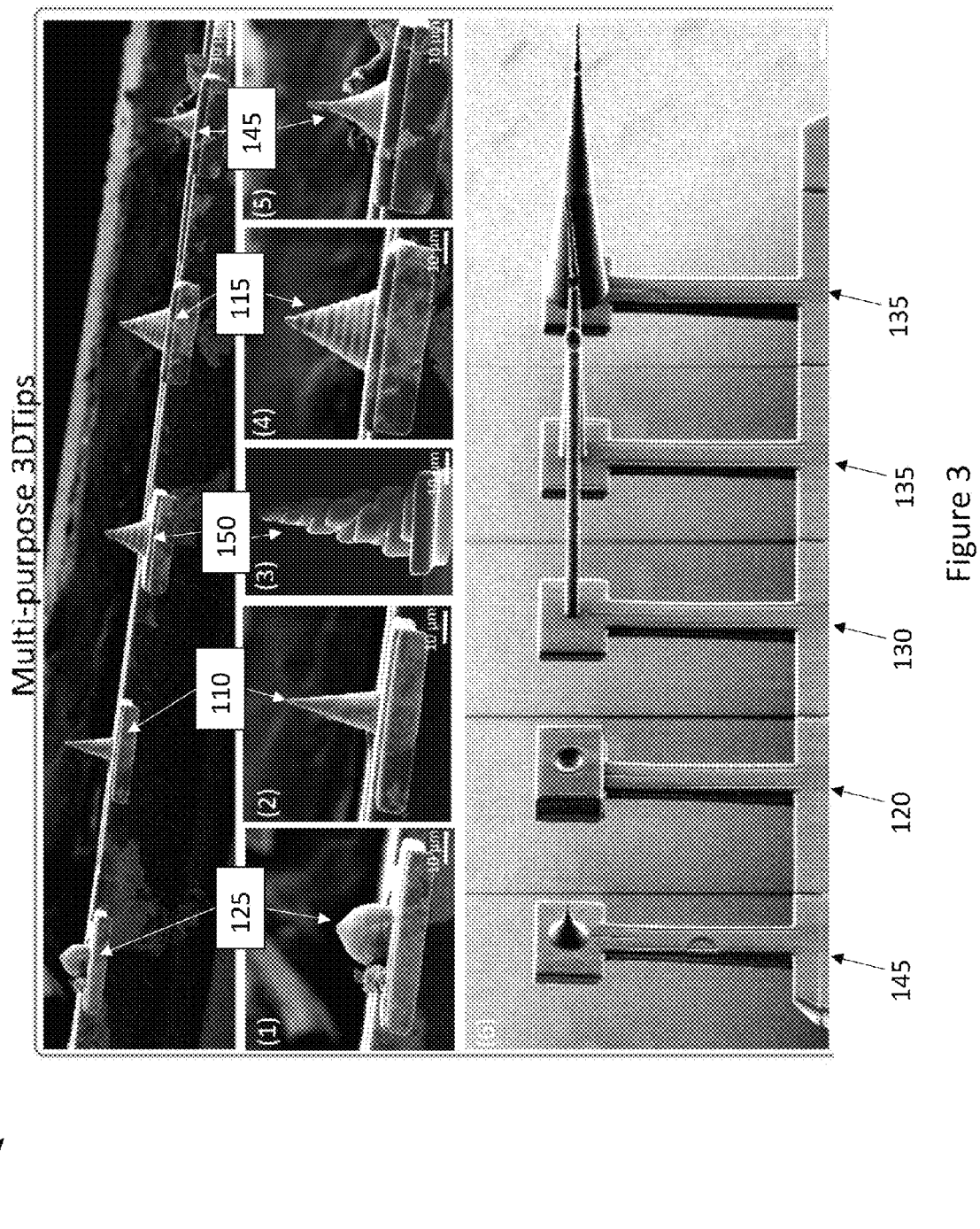
FIG. 3 depicts images of example 3D printed probes in accordance with some embodiments.

FIG. 3 shows SEM images of 3D printed probes 100 with various tip embodiments, such as a colloidal dome 125, a conical cone 110, a flower 150, a conical spring 115, a high aspect ratio reduced cone (puncture) 145, a hemi-sphere cap 120, a 1:50 high aspect ratio pillar 130, and high aspect ratio cones 135 with 1:50 and 1:25 aspect ratios.

Figure 4:
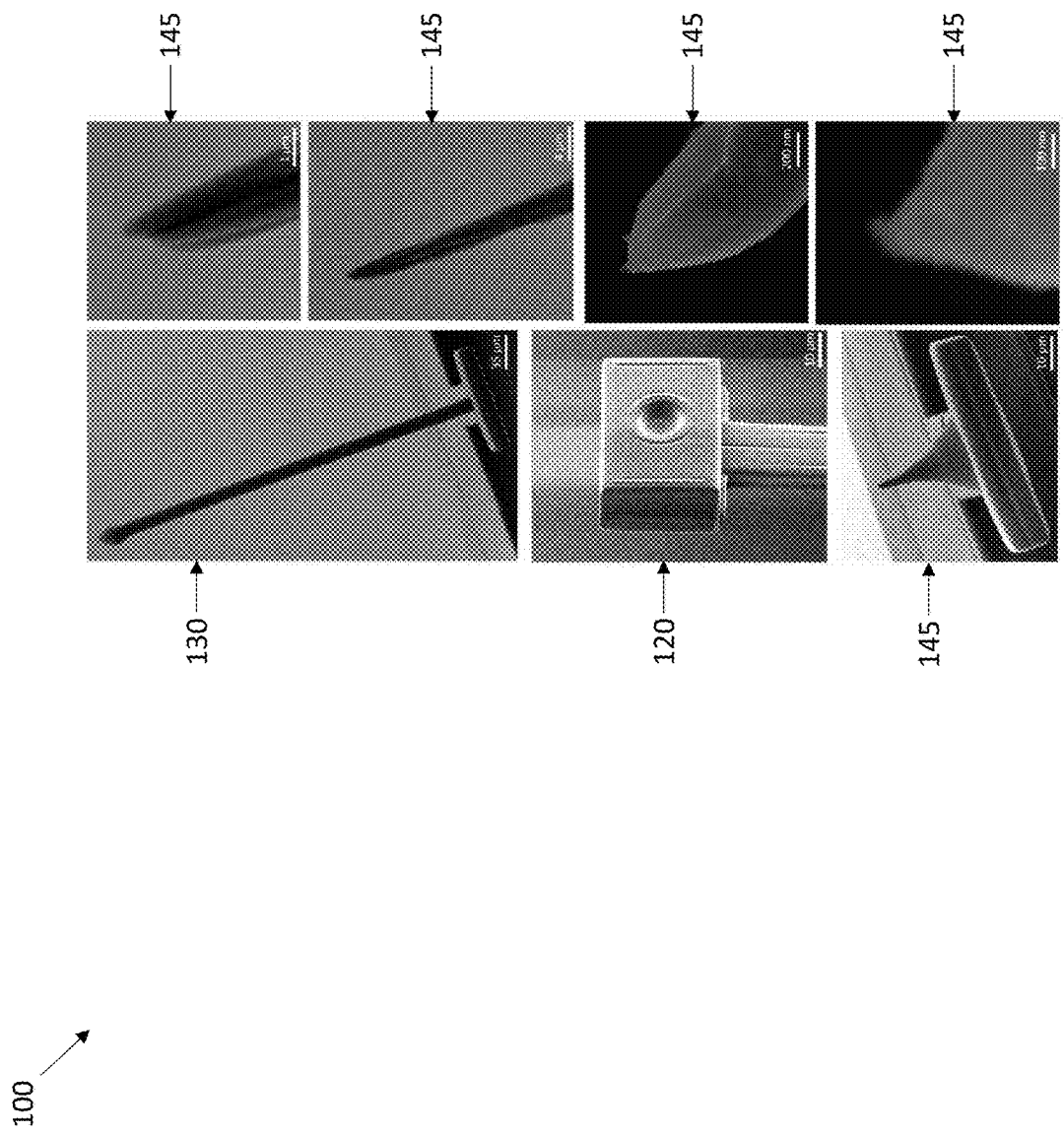
FIG. 4 depicts images of example 3D printed probes in accordance with some embodiments.

FIG. 4 shows zoomed SEM images of various tip embodiments (120, 130, 145) showing a tip radius ranging from 30 to 150 nm.

FIG. 5 shows SEM images of an example embodiment of a 3D printed SU8 probe tip with integrated carbon nanotubes 105 (top row) compared to a standard 3D printed conical SU8 probe tip 110 (bottom row). The CNTs can be seen on the tip 105.

Figure 7:
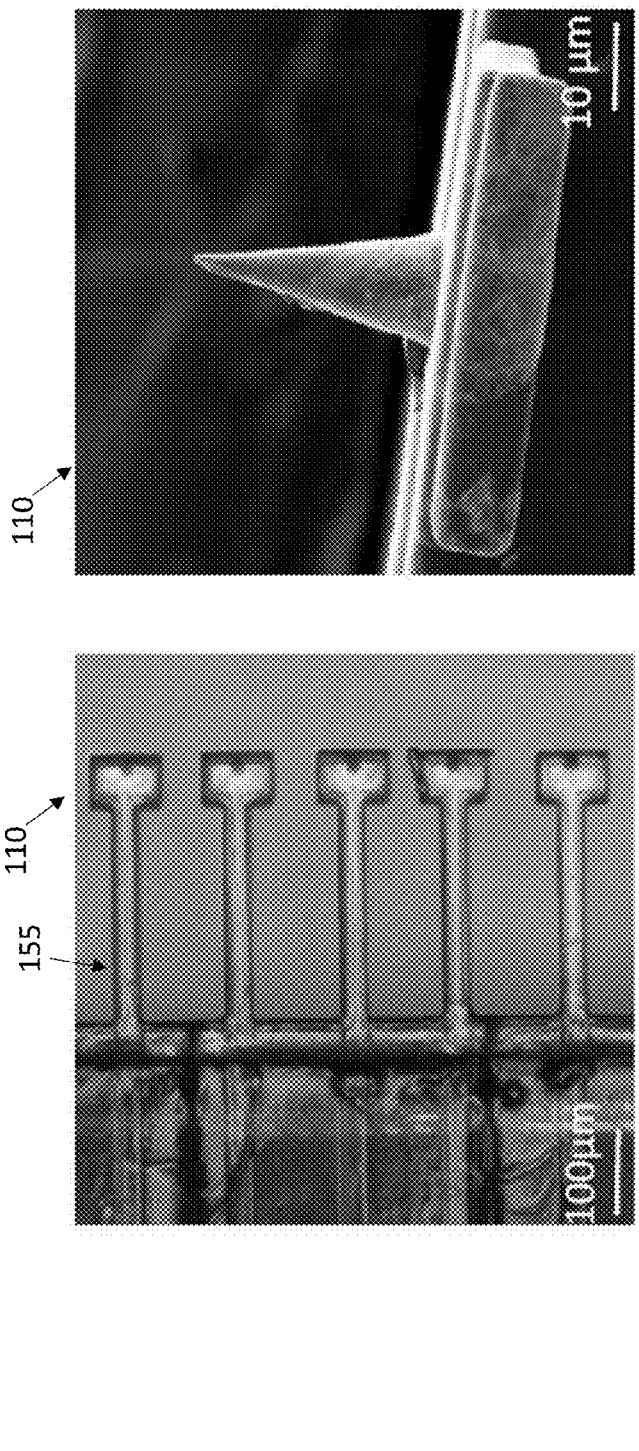
FIG. 7 depicts images of an example probe in accordance with some embodiments.

FIGS. 6 and 7 show details of example embodiments of probes 100 with conical tips 110. In some embodiments, the cantilever 155 has a spring constant k of 0.1-5 N/m, a frequency of 58-78 kHz, a length of 200-205 µm, a width of 29-32 µm, and a thickness of 3-11 µm. In some embodiments, the cantilever 155 has a spring constant k of 0.0001-100 N/m, a frequency of 0.5-1000 kHz, a length of 1-1000 µm, a width of 1-1000 µm, and a thickness of 0.1-1000 µm.

In some embodiments, the cantilever 155 is at least one of a T-shape, a rectangular shape, and L-shape, a trapezoidal shape, a variable-width shape, a triangular shape, and a variable cross-sectional shape. In some embodiments, the variable cross-sectional shape is at least one of a rectangular shape, a trapezoidal shape, a triangular shape, and a curved shape. In some embodiments, the cantilever 155 is configured to accept at least one probe tip of varying shapes. In some embodiments, the probe is coated with a layer of at least one of a metal, a polymer, and a biological material.

In some embodiments, the cantilever 155 is made from SU8. In some embodiments, the cantilever 155 is made from photoresist. In some embodiments, the cantilever 155 is made from polymeric material. In some embodiments, the cantilever 155 includes a coating such as a metal, a polymer, and/or a biological material with a thickness of 150-200 nm. In some embodiments, the cantilever 155 includes a coating with a thickness of 10-1000 nm. In some embodiments, the conical tip 110 has a tip radius of 20-100 nm, a tip height of 50±5 µm, a tip base of 10-20 µm, a front angle of 8°-15°±0.5°, and a back angle of 8°-15°±0.5°. In some embodiments, the conical tip 110 has a tip radius of 10-1000 nm, a tip height of 10-1000 µm, a tip base of 10-1000 µm, a front angle of 0°-90°±0.5°, and a back angle of 0°-90°±0.5°. In some embodiments, the conical tip 110 is made from SU8. In some embodiments, the conical tip 110 is made from photoresist.

Figure 9:
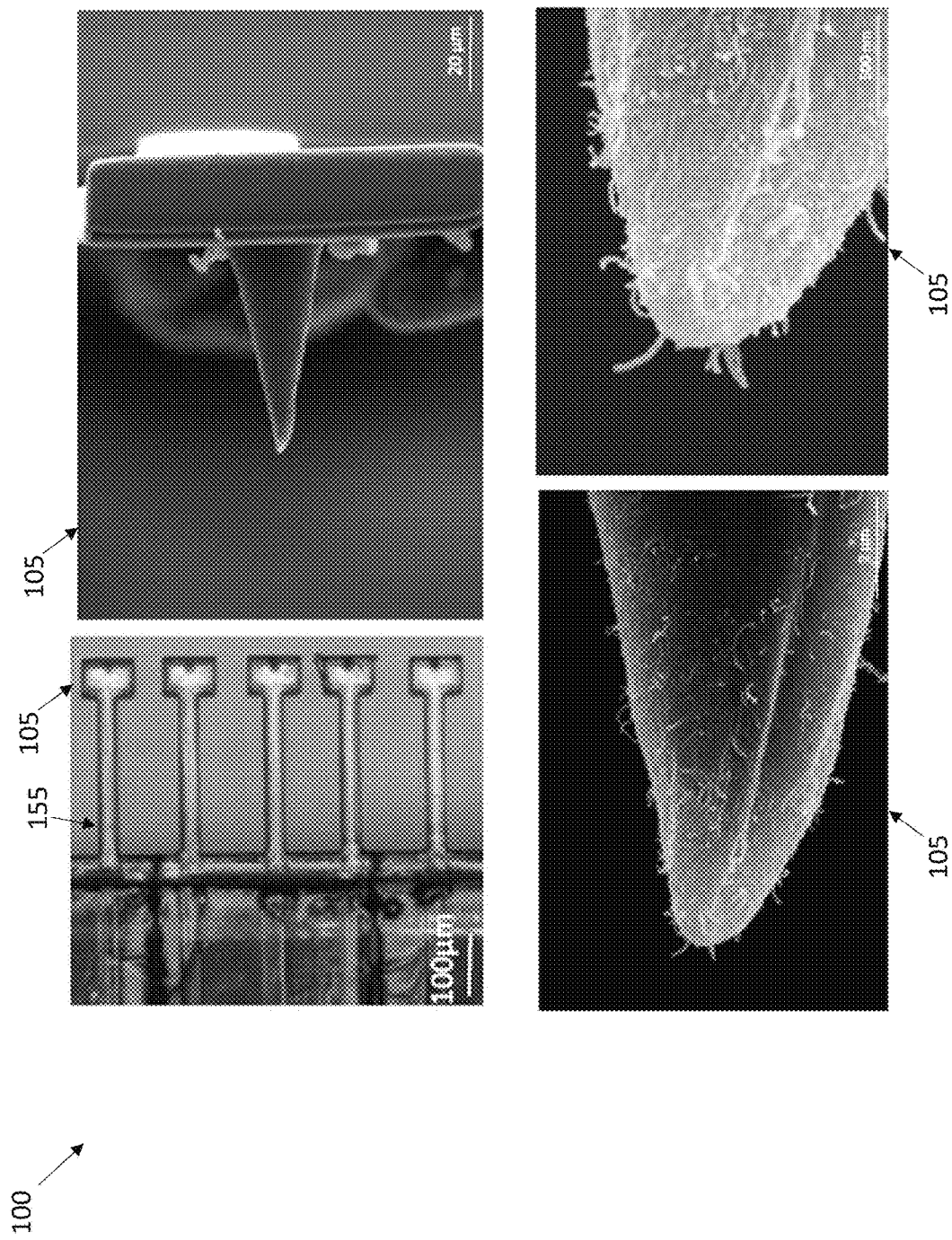
FIG. 9 depicts images of an example probe in accordance with some embodiments.

FIGS. 8 and 9 show details of example embodiments of probes with conical tips with integrated carbon nanotubes 105. In some embodiments, the cantilever 155 has a spring constant k of 0.1-5 N/m, a frequency of 62-78 kHz, a length of 200-205 µm, a width of 29-32 µm, and a thickness of 6-25 µm. In some embodiments, the cantilever 155 has a spring constant k of 0.0001-100 N/m, a frequency of 0.5-1000 kHz, a length of 1-1000 µm, a width of 1-1000 µm, and a thickness of 0.1-1000 µm.

In some embodiments, the cantilever 155 is at least one of a T-shape, a rectangular shape, and L-shape, a trapezoidal shape, a variable-width shape, a triangular shape, and a variable cross-sectional shape. In some embodiments, the variable cross-sectional shape is at least one of a rectangular shape, a trapezoidal shape, a triangular shape, and a curved shape. In some embodiments, the cantilever 155 is configured to accept at least one probe tip of varying shapes. In some embodiments, the probe is coated with a layer of at least one of a metal, a polymer, and a biological material.

In some embodiments, the cantilever 155 is made from SU8. In some embodiments, the cantilever 155 is made from photoresist. In some embodiments, the cantilever 155 is made from polymeric material. In some embodiments, the cantilever 155 includes a coating such as a metal, a polymer, and/or a biological material with a thickness of 150-200 nm. In some embodiments, the cantilever 155 includes a coating with a thickness of 10-1000 nm. In some embodiments, the conical tip with integrated carbon nanotubes 105 has a tip radius of 6.25 nm (equivalent to CNT radius), a tip height of 53±5 µm, a tip base of 10-20 µm, a front angle of 8°-15°±0.5°, and a back angle of 8°-15°±0.5°. In some embodiments, the CNT probe tip 105 has a tip radius of 1-1000 nm, a tip height of 10-1000 μm, a tip base of 10-1000 μm, a front angle of 0°-90°±0.5°, and a back angle of 0°-90°±0.5°. In some embodiments, the conical tip with integrated carbon nanotubes 105 is made from SWCNT and/or MWCNT. In some embodiments, the conical tip 110 is made from SU8. In some embodiments, the conical tip 110 is made from photoresist.

Figure 11:
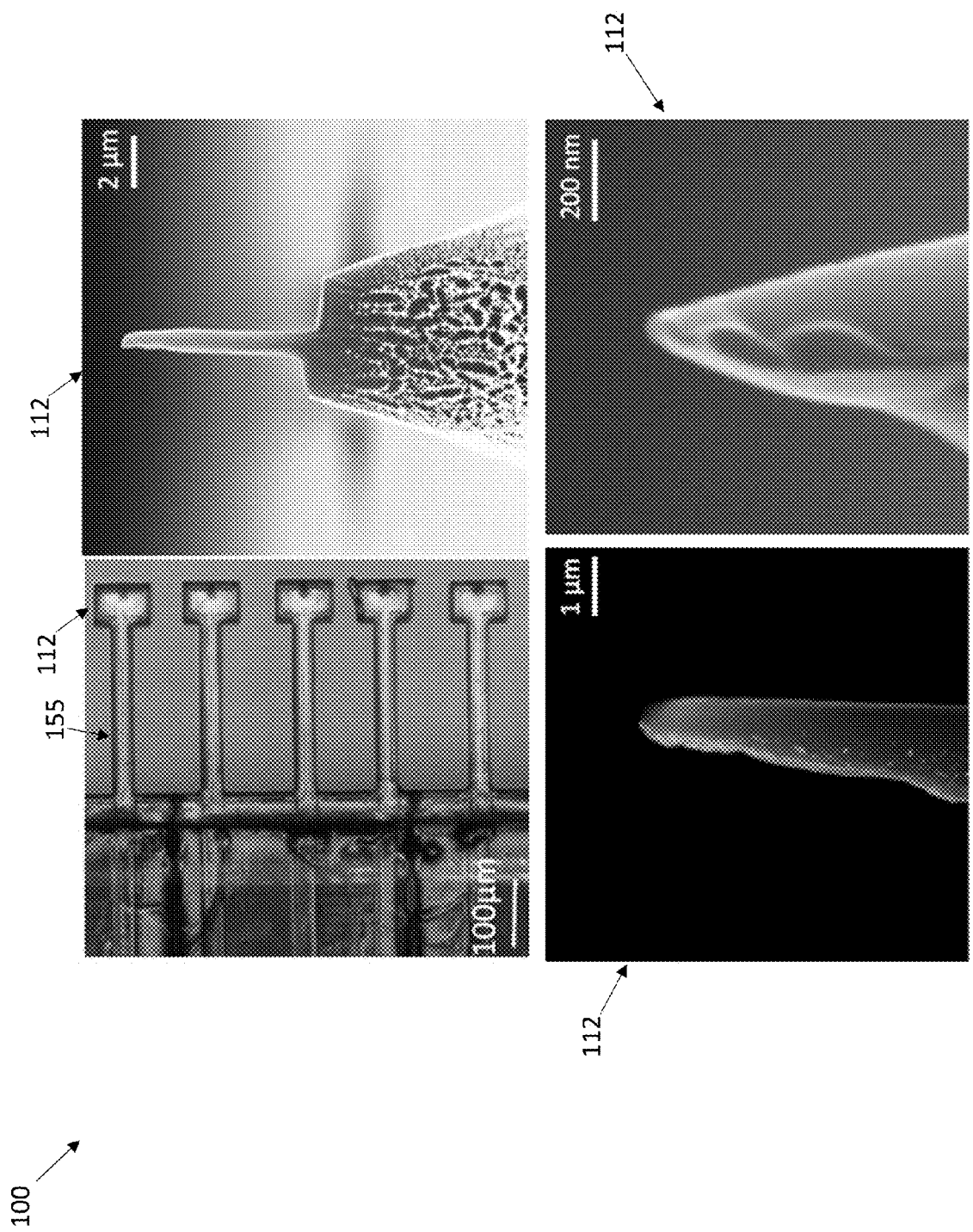
FIG. 11 depicts images of an example probe in accordance with some embodiments.

FIGS. 10 and 11 show details of example embodiments of probes with conical tips post-processed with a focused ion beam 112. In some embodiments, the cantilever 155 has a spring constant k of 0.1-5 N/m, a frequency of 62-78 kHz, a length of 200-205 μm, a width of 29-32 μm, and a thickness of 6-25 μm. In some embodiments, the cantilever 155 has a spring constant k of 0.0001-100 N/m, a frequency of 0.5-1000 kHz, a length of 1-1000 μm, a width of 1-1000 μm, and a thickness of 0.1-1000 μm.

In some embodiments, the cantilever 155 is at least one of a T-shape, a rectangular shape, and L-shape, a trapezoidal shape, a variable-width shape, a triangular shape, and a variable cross-sectional shape. In some embodiments, the variable cross-sectional shape is at least one of a rectangular shape, a trapezoidal shape, a triangular shape, and a curved shape. In some embodiments, the cantilever 155 is configured to accept at least one probe tip of varying shapes. In some embodiments, the probe is coated with a layer of at least one of a metal, a polymer, and a biological material.

In some embodiments, the cantilever 155 is made from SU8. In some embodiments, the cantilever 155 is made from photoresist. In some embodiments, the cantilever 155 is made from polymeric material. In some embodiments, the cantilever 155 includes a coating such as a metal, a polymer, and/or a biological material with a thickness of 150-200 nm. In some embodiments, the cantilever 155 includes a coating with a thickness of 10-1000 nm. In some embodiments, the conical tips post-processed with a focused ion beam 112 have a tip radius of 10-20 nm, a tip height of 53±5 μm, a tip base of 10-20 μm, a front angle of 8°-15°±0.5°, and a back angle of 8°-15°±0.5°. In some embodiments, the tip 112 has a tip radius of 10-1000 nm, a tip height of 10-1000 μm, a tip base of 10-1000 μm, a front angle of 0°-90°±0.5°, and a back angle of 0°-90°±0.5°. In some embodiments, the conical tip is post-processed with a focused ion beam 112 is made from SU8. In some embodiments, the tip 112 is made from photoresist. In some embodiments, the tip 112 is made from polymeric material. In some embodiments, the tip 122 is post processed with a reactive ion etching. In some embodiments, the tip 122 is post processed with a chemical vapor deposition and/or a sputtering.

Figure 12:
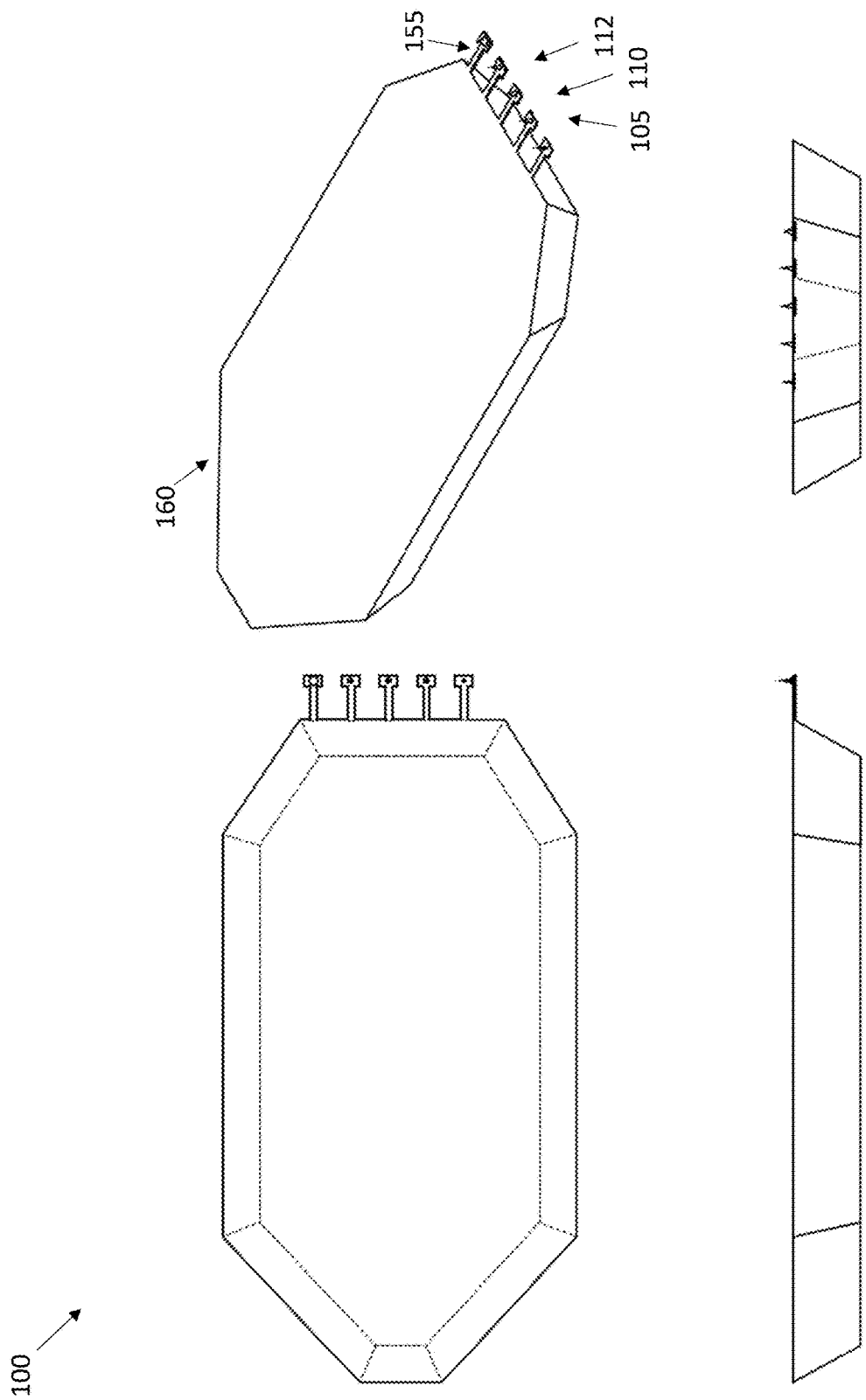
FIG. 12 depicts a technical drawing of an example probe device in accordance with some embodiments.
Figure 13:
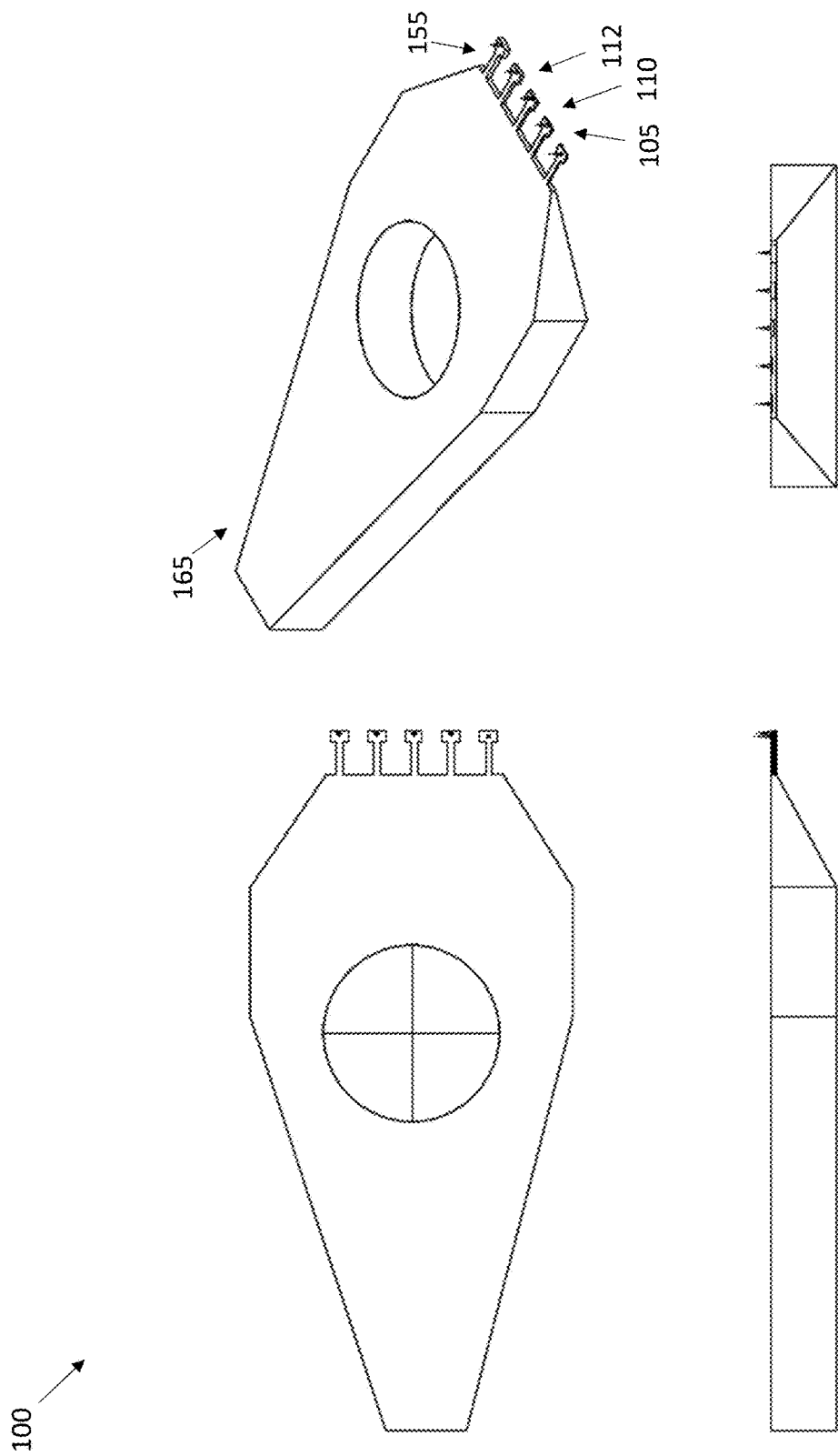
FIG. 13 depicts a technical drawing of an example probe device in accordance with some embodiments.
Figure 14:
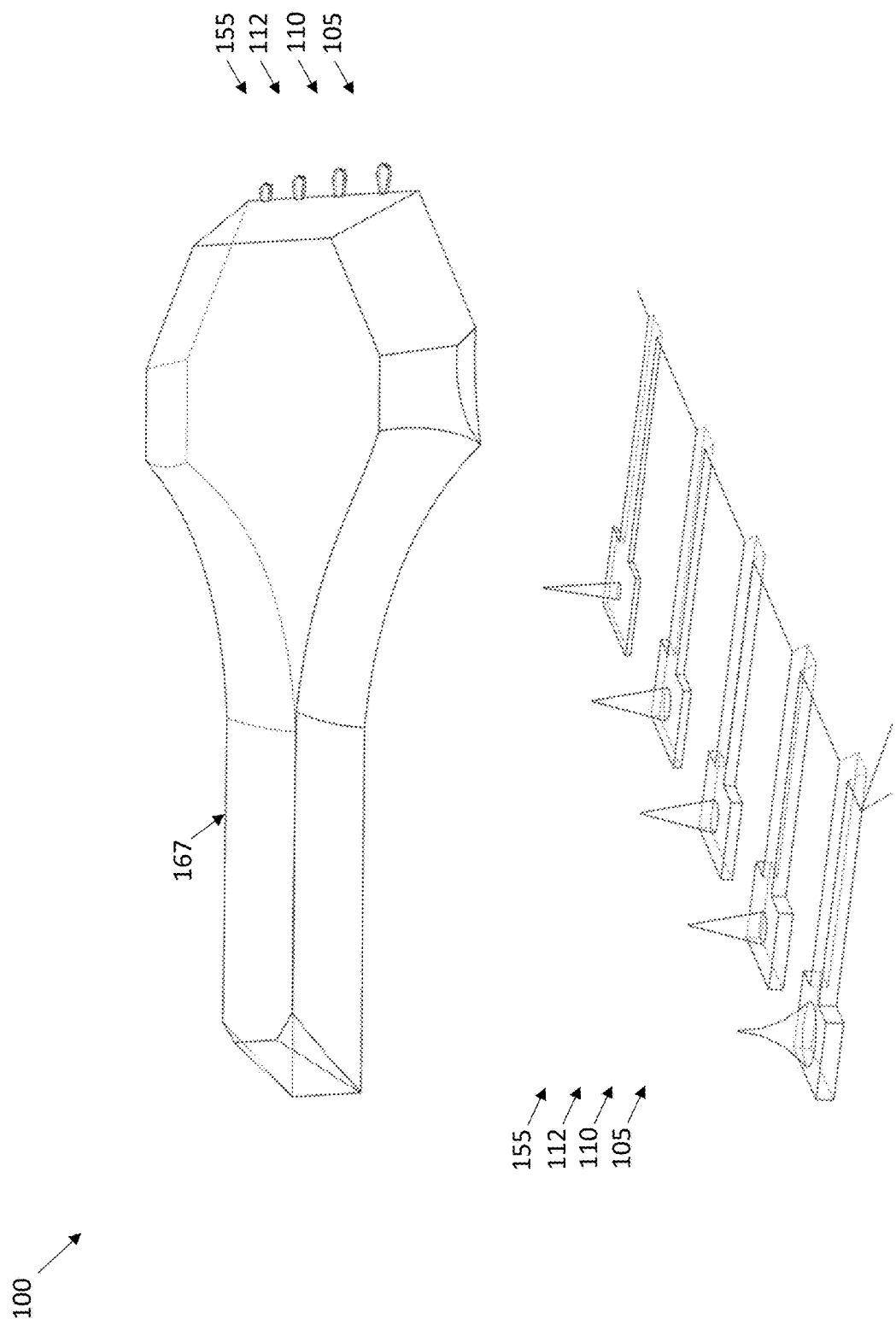
FIG. 14 depicts a technical drawing of an example probe device in accordance with some embodiments.

FIGS. 12, 13 and 14 show example embodiments of multi-tip probe holders (160, 165, 167) utilizing conical tips 110, conical tips with integrated carbon nanotubes 105, and/or conical tips post-processed with a focused ion beam 112. In some embodiments, the multi-tip probe holder (160, 165, 167) can comprise any number of cantilevers 155 and any number of tips (105, 110, 112). In some embodiments, the multi-tip probe holder (160, 165, 167) includes five cantilevers 155 and five probe tips (105, 110, 112) designed to function in air and liquid, in contact and dynamic mode, and to probe soft and hard samples with unprecedented wear resistance. The example multi-tip probe holder (160, 165, 167) embodiments are 3D printed and made of SU8 material, which is known for its minimal surface energy when compared to the traditional Si based tips, thus provided for reduced contamination and an improvement in overall resolution. They are designed to have high aspect ratio tips (105, 110, 112), which produce improved accuracy in the XY direction, and thus avoids thickness overestimation when measuring rough surfaces and high aspect ratio features. In some embodiments, the example probe holder includes five cantilevers 155 with spring constants ranging from 0.1 to 5 N/m suitable for probing a variety of samples ranging from soft biological samples such as cells to hard materials such as glass. The cantilevers resonate at frequencies ranging from 58 to 78 kHz and can be excited at 3 or more eigen-frequencies that can be detected within 10-2000 kHz range, thus making them suitable for multifrequency scanning microscopy applications. Probe holder 160 resembles commercially available probe holders for silicone probes, while probe holders 165 and 167 are designed for improved handling and shorter printing manufacturing time and material.

Figure 16:
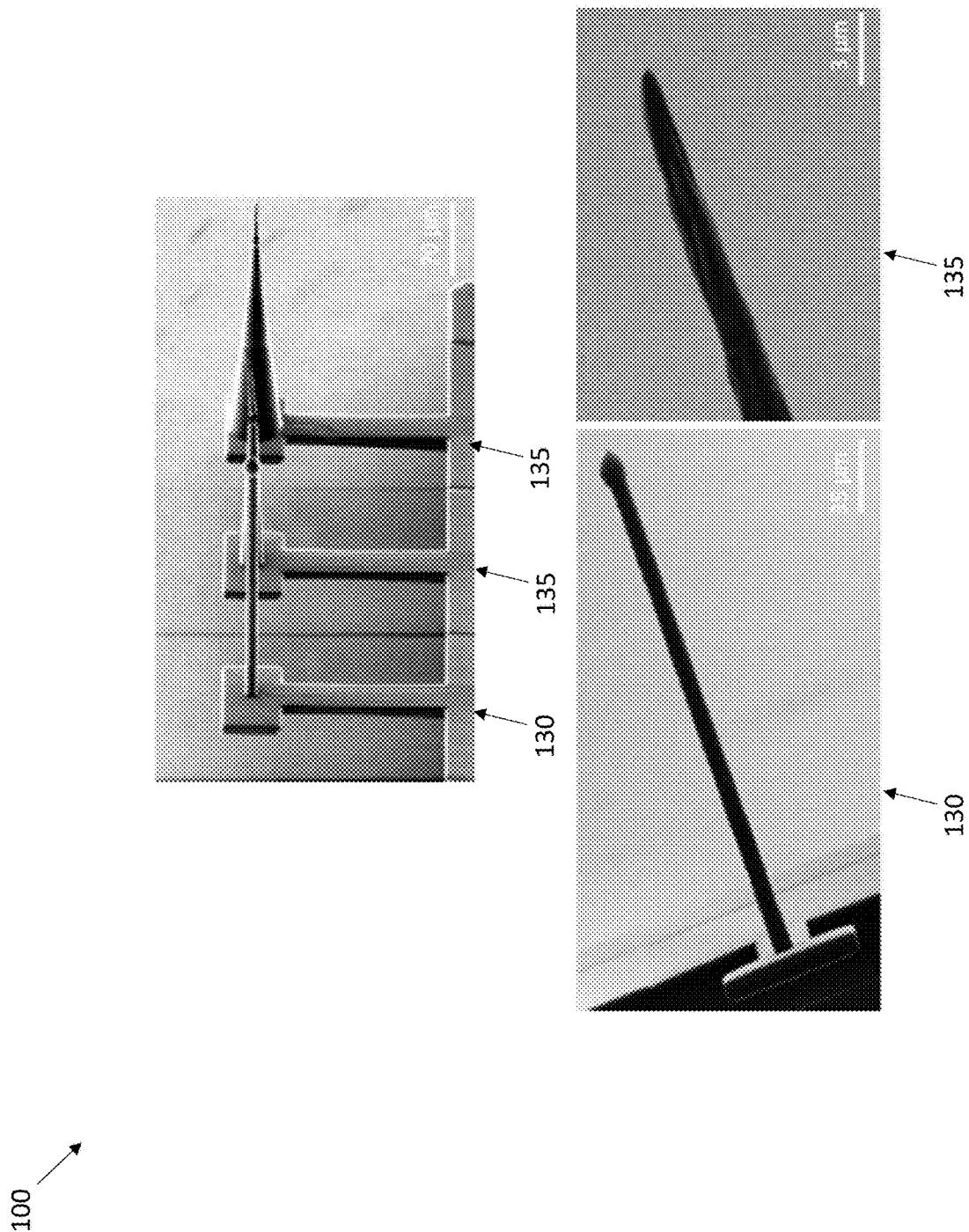
FIG. 16 depicts images of an example probe in accordance with some embodiments.

FIGS. 15 and 16 show details of example embodiments of high aspect ratio probe tips (130, 135). In some embodiments, the cantilever 155 has a spring constant k of 0.1-5 N/m, a length of 200-205 μm, a width of 29-32 μm, and a thickness of 6-25 μm. In some embodiments, the cantilever 155 has a spring constant k of 0.0001-100 N/m, a frequency of 0.5-1000 kHz, a length of 1-1000 μm, a width of 1-1000 μm, and a thickness of 0.1-1000 μm.

In some embodiments, the cantilever 155 is at least one of a T-shape, a rectangular shape, and L-shape, a trapezoidal shape, a variable-width shape, a triangular shape, and a variable cross-sectional shape. In some embodiments, the variable cross-sectional shape is at least one of a rectangular shape, a trapezoidal shape, a triangular shape, and a curved shape. In some embodiments, the cantilever 155 is configured to accept at least one probe tip of varying shapes. In some embodiments, the probe is coated with a layer of at least one of a metal, a polymer, and a biological material.

In some embodiments, the cantilever 155 is made from SU8. In some embodiments, the cantilever 155 is made from photoresist. In some embodiments, the cantilever 155 is made from polymeric material. In some embodiments, the cantilever 155 includes a coating such as a metal, a polymer, and/or a biological material with a thickness of 150-200 nm. In some embodiments, the cantilever 155 includes a coating with a thickness of 10-1000 nm. In some embodiments, the high aspect ratio probe tips (130, 135) have a tip length of 350 μm, a tip base diameter of 10-40 μm, a tip angle of 0°-8°, and a tip end radius of 0.1-5 μm. In some embodiments, the tips (130, 135) have a tip length of 10-1000 μm, a tip base of 10-1000 μm, a front angle of 0°-90°±0.5°, and a back angle of 0°-90°±0.5°. In some embodiment the tip 130 is cylindrically shaped. In some embodiments, the tip 135 is conically shaped. In some embodiments, the tip (130, 135) is made from SU8. In some embodiments, the conical tip 110 is made from photoresist. In some embodiments, the conical tip 110 is made from polymeric material. The high aspect ratio style tips (130, 135) are designed to include a long high aspect ratio tip with a ratio of about 1:35. The high aspect ratio tips permit reaching single cells within microwells with depths up to 200 μm. They can be used to probe cell elasticity, adhesive forces, and can also be used to pierce single cells within the microwells.

Figure 17:
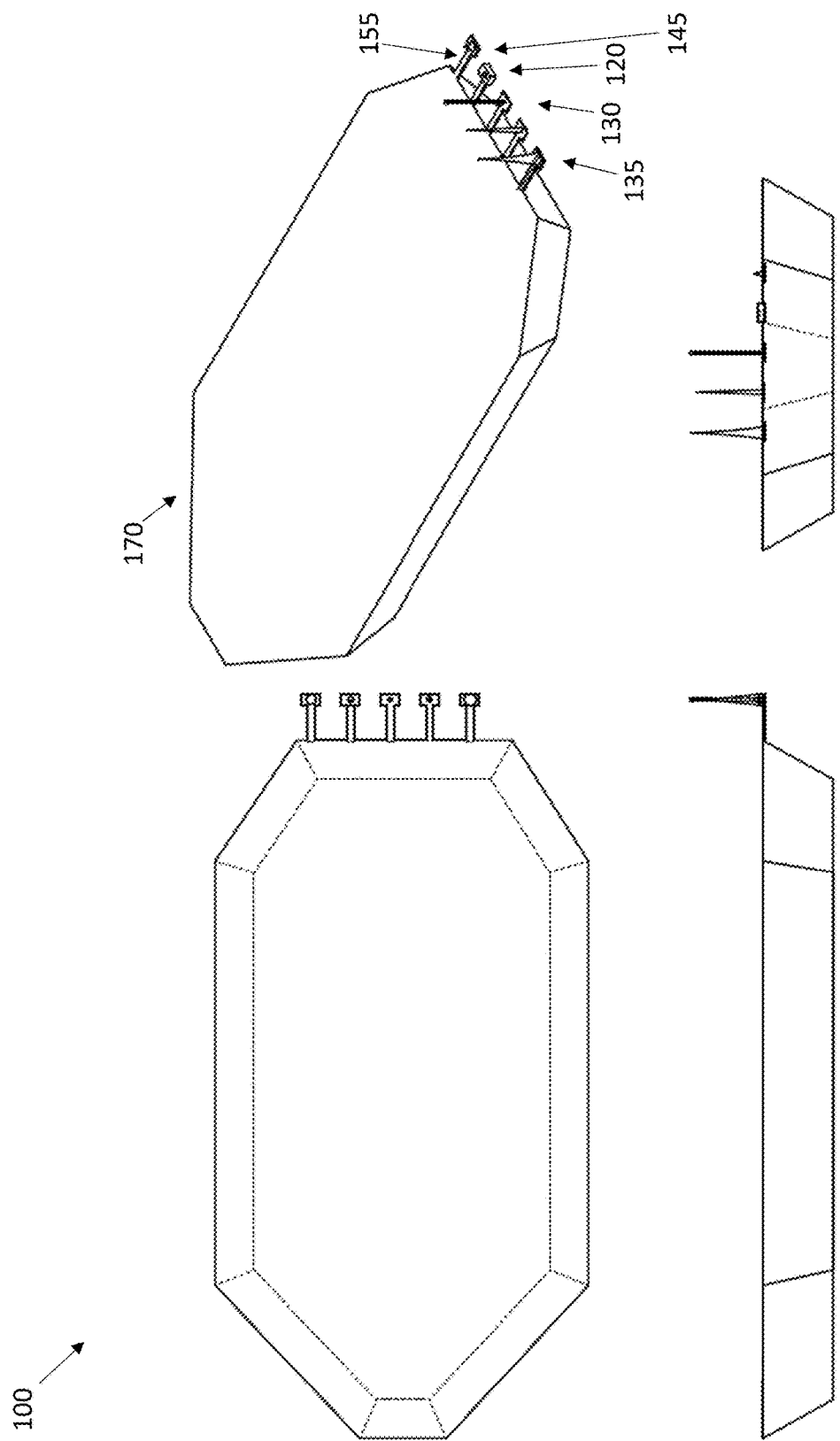
FIG. 17 depicts a technical drawing of an example probe device in accordance with some embodiments.

FIG. 17 shows an example embodiment of a multi-tip probe holder 170 utilizing high aspect ratio tips (130, 135), a cap tip 120, and a puncture tip 145. In some embodiments, the multi-tip probe holder 170 can comprise any number of cantilevers 155 and any number of tips (130, 135, 140, 145). In some embodiments, the multi-tip probe holder 170 includes five cantilevers 155 and five probe tips (120, 130, 135, 145) designed to function in air and liquid, in contact and dynamic mode, and to probe soft and hard samples with unprecedented wear resistance. The example multi-tip probe holder 170 is 3D printed and made of SU8 material, which is known for its minimal surface energy when compared to the traditional Si based tips, thus provided for reduced contamination and an improvement in overall resolution. It is designed to have high aspect ratio tips (130, 135), which produce improved accuracy in the XY direction, and thus avoids thickness overestimation when measuring rough surfaces and high aspect ratio features.

Figure 19:
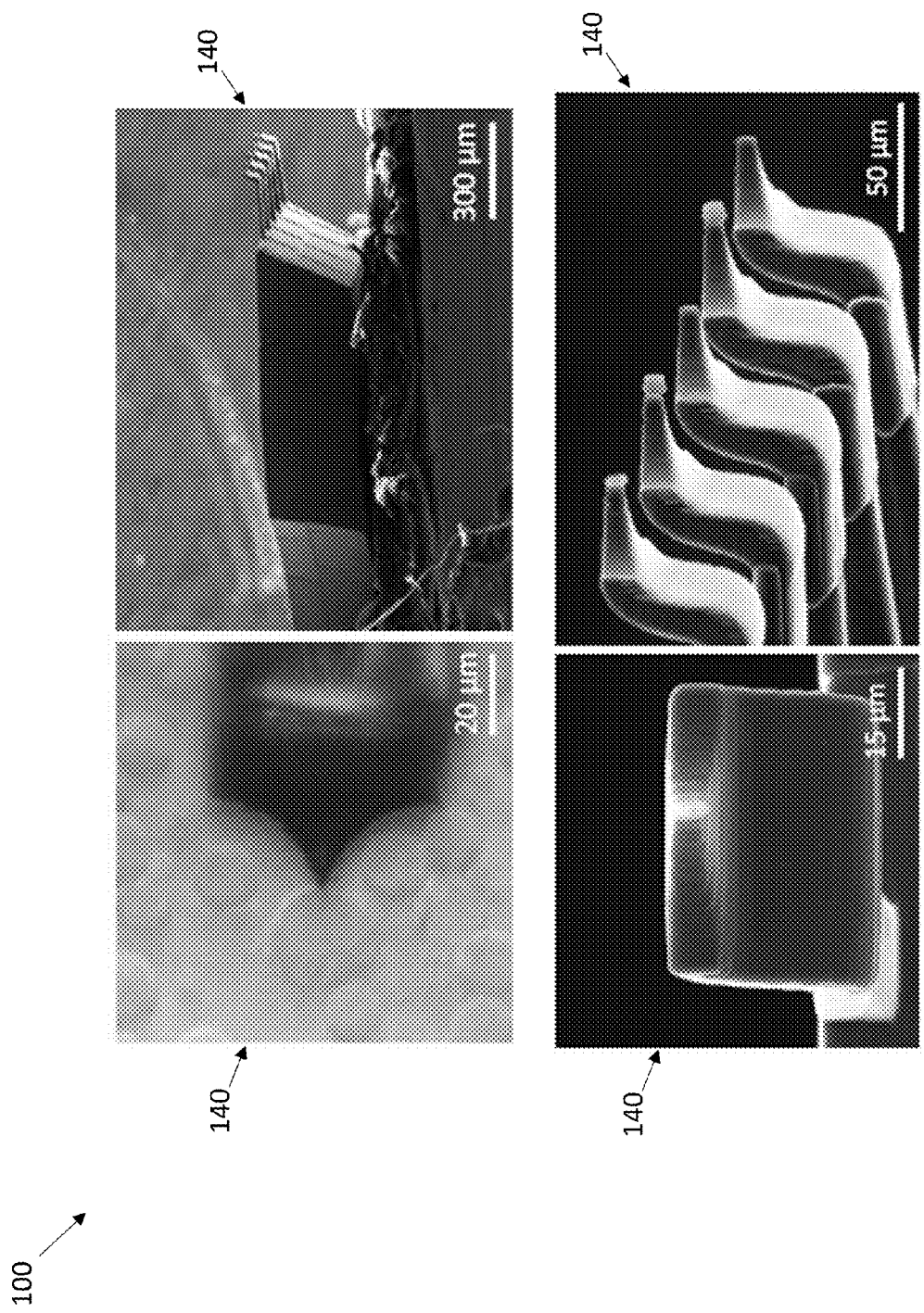
FIG. 19 depicts images of an example probe in accordance with some embodiments.

FIGS. 18 and 19 show details of example embodiments of probes with shovel tips 140. In some embodiments, the cantilever 155 has a spring constant k of 0.1-5 N/m, a frequency of 62-78 kHz, a length of 200-205 µm, a width of 29-32 µm, and a thickness of 6-25 µm. In some embodiments, the cantilever 155 has a spring constant k of 0.0001-100 N/m, a frequency of 0.5-1000 kHz, a length of 1-1000 µm, a width of 1-1000 µm, and a thickness of 0.1-1000 µm.

In some embodiments, the cantilever 155 is at least one of a T-shape, a rectangular shape, and L-shape, a trapezoidal shape, a variable-width shape, a triangular shape, and a variable cross-sectional shape. In some embodiments, the variable cross-sectional shape is at least one of a rectangular shape, a trapezoidal shape, a triangular shape, and a curved shape. In some embodiments, the cantilever 155 is configured to accept at least one probe tip of varying shapes. In some embodiments, the probe is coated with a layer of at least one of a metal, a polymer, and a biological material.

In some embodiments, the cantilever 155 is made from SU8. In some embodiments, the cantilever 155 is made from photoresist. In some embodiments, the cantilever 155 is made from polymeric material. In some embodiments, the cantilever 155 includes a coating such as a metal, a polymer, and/or a biological material with a thickness of 150-200 nm. In some embodiments, the cantilever 155 includes a coating with a thickness of 10-1000 nm. In some embodiments, the shovel tips 140 have a shovel height of 55 µm, a shovel width of 80 µm, a shovel thickness of 20 µm, a shovel length of 75 µm, and an edge thickness of 3 µm. In some embodiments, the shovel tips 140 have a shovel height of 1-1000 µm, a shovel width of 1-1000 µm, a shovel thickness of 1-1000 µm, a shovel length of 1-1000 µm, and an edge thickness of 1-1000 µm. In some embodiments, the shovel tip 140 is made from SU8. In some embodiments, the shovel tip 140 is made from photoresist. In some embodiments, the shovel tip 140 is made from polymeric material. The shovel tips 140 are designed to include a shovel like structure at the cantilever end with a far reaching horizontal sharp edge. They are designed for a novel approach to measure single cell elasticity and adhesive forces, and can also be used to horizontally pierce singles cells and divide a single cell into two parts. Unlike the common vertical approach, the example shovel embodiment allows for horizontal cell manipulation. This provides a key advantage that permits viewing of the cells, and thus better control when performing experiments. In some embodiments, the shovel tips 140 are oriented parallel to the cantilevers 155. In some embodiments, the shovel tips 140 are oriented perpendicular to the cantilevers 155.

Figure 20:
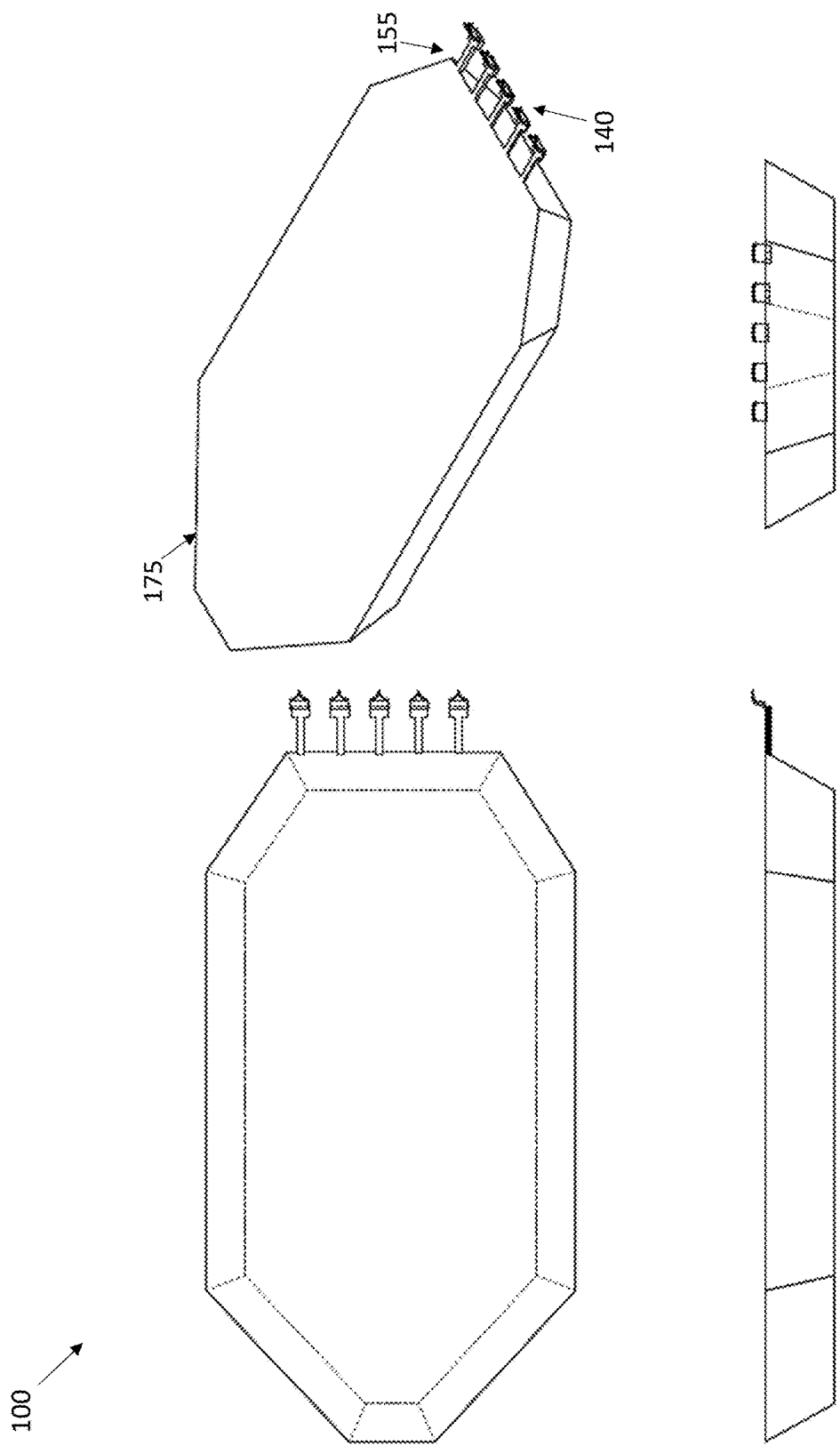
FIG. 20 depicts a technical drawing of an example probe device in accordance with some embodiments.
Figure 21:
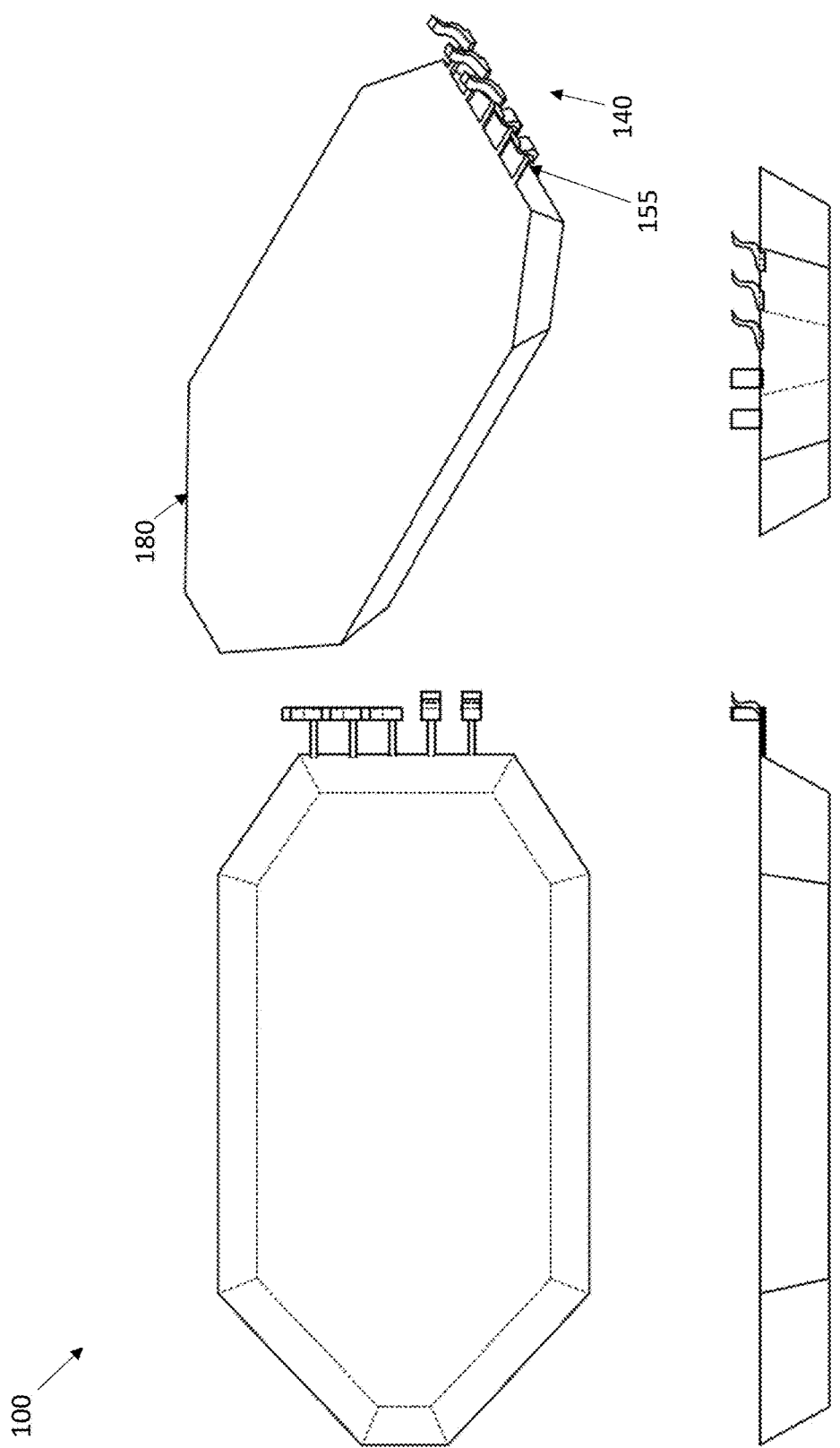
FIG. 21 depicts a technical drawing of an example probe device in accordance with some embodiments.

FIGS. 20 and 21 show example embodiments of multi-tip probe holders (175, 180) utilizing shovel tips 140. In some embodiments, the multi-tip probe holders (175, 180) can comprise any number of cantilevers 155 and any number of tips 140. In some embodiments, the multi-tip probe holder (175, 180) includes five cantilevers 155 and five probe tips 140 designed to function in air and liquid, in contact and dynamic mode, and to probe soft and hard samples with unprecedented wear resistance. The example multi-tip probe 180 is 3D printed and made of SU8 material, which is known for its minimal surface energy when compared to the traditional Si based tips, thus provided for reduced contamination and an improvement in overall resolution.

Figure 23:
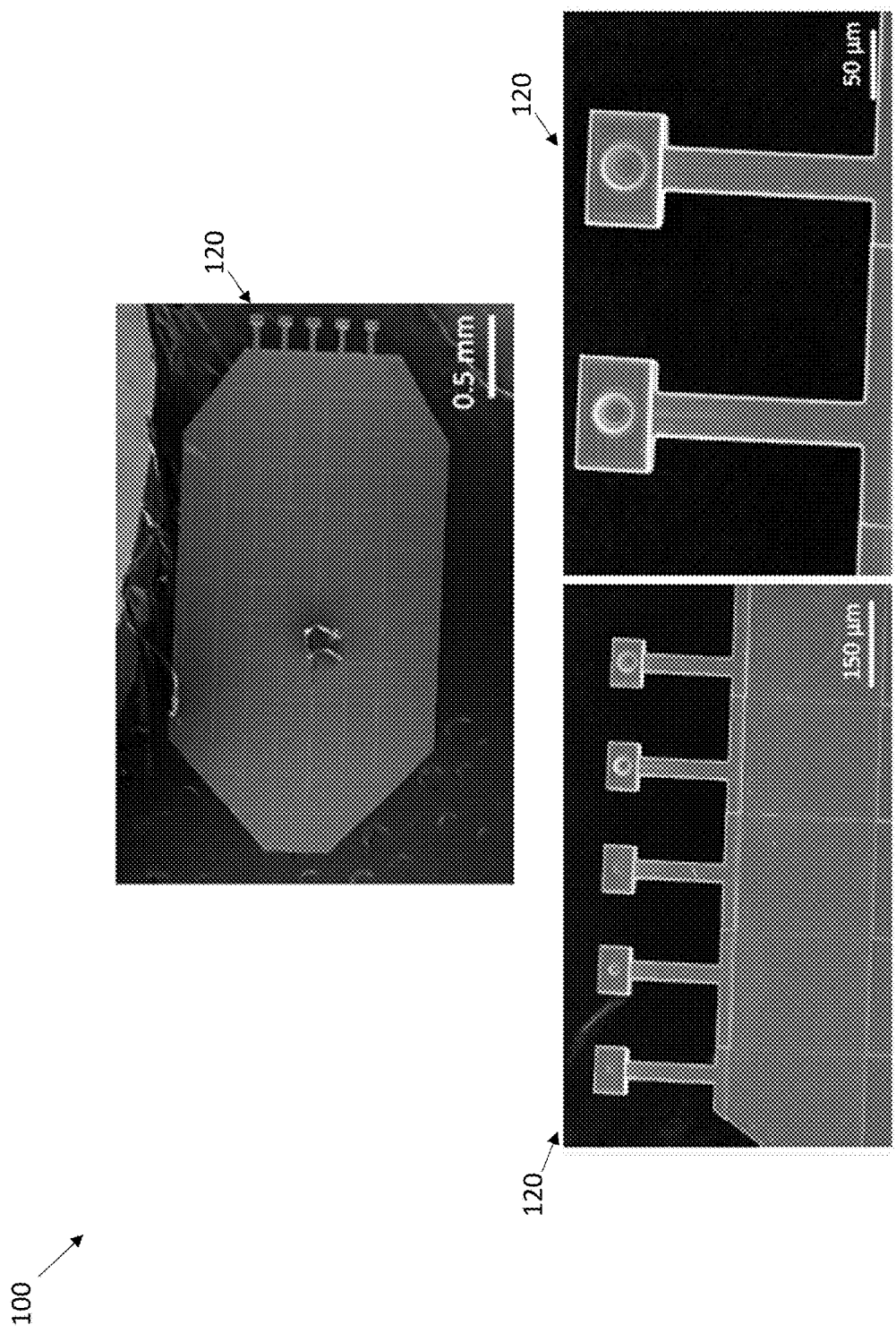
FIG. 23 depicts images of an example probe in accordance with some embodiments.

FIGS. 22 and 23 show example embodiments of cap style probe tips 120. In some embodiments, the cantilever 155 has a spring constant k of 0.1-5 N/m, a frequency of 62-78 kHz, a length of 200-205 µm, a width of 29-32 µm, and a thickness of 6-25 µm. In some embodiments, the cantilever 155 has a spring constant k of 0.0001-100 N/m, a frequency of 0.5-1000 kHz, a length of 1-1000 µm, a width of 1-1000 µm, and a thickness of 0.1-1000 µm.

In some embodiments, the cantilever 155 is at least one of a T-shape, a rectangular shape, and L-shape, a trapezoidal shape, a variable-width shape, a triangular shape, and a variable cross-sectional shape. In some embodiments, the variable cross-sectional shape is at least one of a rectangular shape, a trapezoidal shape, a triangular shape, and a curved shape. In some embodiments, the cantilever 155 is configured to accept at least one probe tip of varying shapes. In some embodiments, the probe is coated with a layer of at least one of a metal, a polymer, and a biological material.

In some embodiments, the cantilever 155 is made from SU8. In some embodiments, the cantilever 155 is made from photoresist. In some embodiments, the cantilever 155 is made from polymeric material. In some embodiments, the cantilever 155 includes a coating such as a metal, a polymer, and/or a biological material with a thickness of 150-200 nm. In some embodiments, the cantilever 155 includes a coating with a thickness of 10-1000 nm. In some embodiments, the cap style tip 120 has a cap diameter of 10-32 µm, a block length of 55 µm, a block width of 75 µm, and a block thickness of 25 µm. In some embodiments, the cap style tip 120 has a cap diameter of 1-1000 µm, a block length of 1-1000 µm, a block width of 1-1000 µm, and a block thickness of 1-1000 µm. In some embodiments, the cap style tip 120 includes a hemi-spherical cavity. In some embodiments, the cap style tip 120 is made from SU8 and is designed to include a cantilever end with a cavity at its bottom surface. In some embodiments, the cap style tip 120 is made from photoresist and is designed to include a cantilever end with a hem i-spherical cavity. In some embodiments, the cap style tip 120 is made from polymeric material and is designed to include a cantilever end with a hemi-spherical cavity. The cap style tip 120 with hemi-spherical cavity can be utilized for a novel approach to measure the elasticity of single cells whereby positioning the hemi-spherical cavity on top of a single cell and squeezing, the cell takes the shape of the cavity allowing a uniform distribution of forces acting on the cell.

Figure 24:
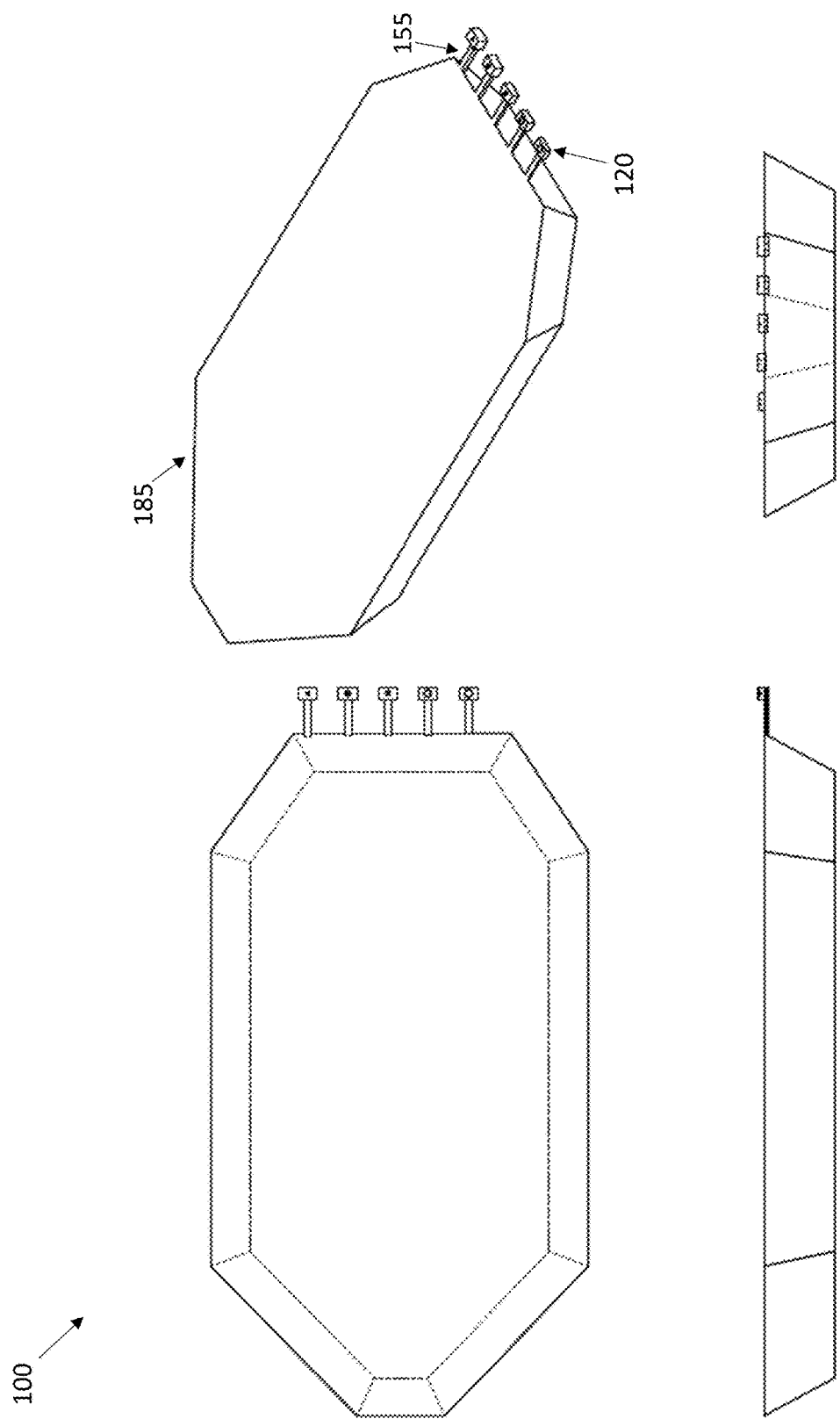
FIG. 24 depicts a technical drawing of an example probe device in accordance with some embodiments.

FIG. 24 shows an example embodiment of a multi-tip probe 185 utilizing cap tips 120. In some embodiments, the multi-tip probe 185 can comprise any number of cantilevers 155 and any number of tips 120. In some embodiments, the multi-tip probe 185 includes five cantilevers 155 and five cap tips 120. The example multi-tip probe 185 is 3D printed and made of SU8 material, which is known for its minimal surface energy when compared to the traditional Si based tips, thus provided for reduced contamination and an improvement in overall resolution.

Figure 25:
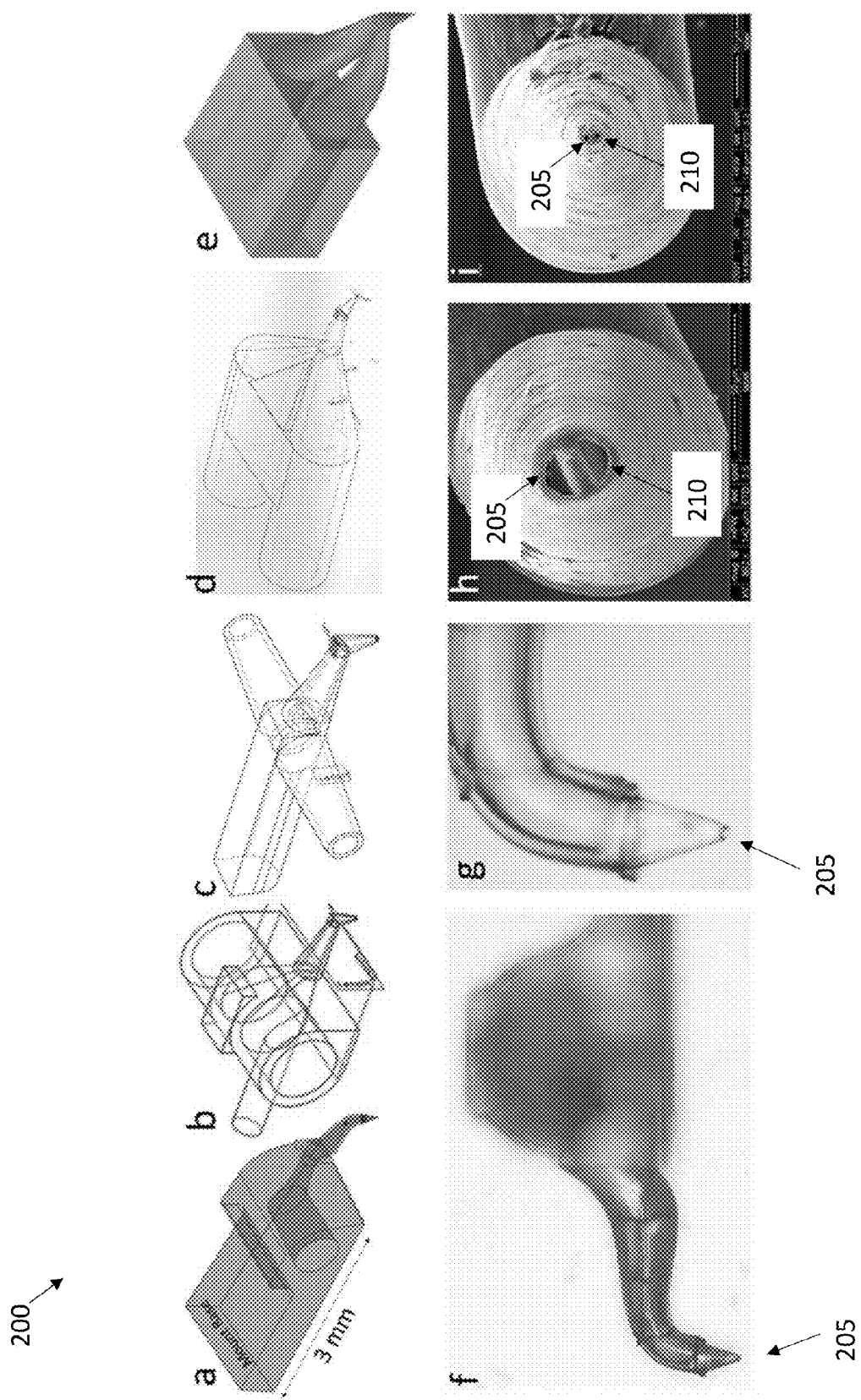
FIG. 25 depicts technical drawings and images of example probes in accordance with some embodiments.

FIG. 25 shows example technical drawings and images of a probe 200 including at least one integrated fluidic element. Section A shows an isometric view of example of a probe 200 with a single fluidic element. Sections B-E shows isometric views of examples of probes 200 with two fluidic elements. Sections F-G show optical microscope images of a side view of a single fluidic element probe 200 including a first aperture 205. Sections H-I show SEM images of the tip of a probe 200 with two fluidic elements including a first aperture 205 and a second aperture 210. The fluidic elements and apertures allow for the use of the probe 200 in scanning microscopy imaging applications with the added benefit of fluidic applications. In some embodiments, the fluidic elements comprise at least one of a mesofluidic channel, a microfluidic channel, a nanofluidic channel, a straight channel, a serpentine channel, a filter, a chamber, a shape varying fluidic element, a 3D fluidic element, and a cross-sectional shape varying fluidic element.

Some aspects of the present invention may be made using an additive manufacturing (AM) process. Among the most common forms of additive manufacturing are the various techniques that fall under the umbrella of "3D Printing", including but not limited to stereolithography (SLA), digital light processing (DLP), fused deposition modelling (FDM), selective laser sintering (SLS), selective laser melting (SLM), electronic beam melting (EBM), and laminated object manufacturing (LOM). These methods variously "build" a three-dimensional physical model of a part, one layer at a time, providing significant efficiencies in rapid prototyping and small-batch manufacturing. AM also makes possible the manufacture of parts with features that conventional subtractive manufacturing techniques (for example CNC milling) are unable to create.

Suitable materials for use in AM processes include, but are not limited to, using materials including but not limited to nylon, polyethylene terephthalate (PET), acrylonitrile butadiene styrene (ABS), resin, polylactic acid (PLA), polystyrene, and the like. In some embodiments, an AM process may comprise building a three-dimensional physical model from a single material, while in other embodiments, a single AM process may be configured to build the three-dimensional physical model from more than one material at the same time.

The probe 100 can be produced via a method comprising providing a 3D printed probe design, and 3D printing a probe 100. In some embodiments, the method further comprises 3D printing the probe 100 from SU8 epoxy-based resin. In some embodiments, the method further comprises 3D printing the probe 100 from photoresist. In some embodiments, the method further comprises mixing a nanomaterial with the photoresist before manufacturing. In some embodiments, the method further comprises introducing a nanomaterial during manufacturing. In some embodiments, the method further comprises dipping the probe 100 into a nanomaterial population to embed the nanomaterial in the probe 100. In some embodiments, the method further comprises dipping the probe 100 into a nanomaterial population to embed the nanomaterial in the probe 100 while the probe 100 is in a semi-cured state. In some embodiment the nanomaterial is introduced during the additive manufacturing process. In some embodiment the nanomaterial is homogeneously mixed with the photoresist before 3D printing. In some embodiments, the probe 100 is 3D printed using 2-photon 3D printing. In some embodiments, the probe design is a custom design. In some embodiments, the probe 100 includes at least one aperture 205 and at least one fluidic element. In some embodiments the method further comprises post-processing the probe 100 with a focused ion beam. In some embodiments the method further comprises post-processing the probe 100 with a reactive ion etching. This post-processing can be utilized to enhance the tip properties of the probe 100 for specific applications. In some embodiments, the nanomaterial is at least one of carbon nanotubes, nanorods, and nanoparticles. In some embodiments, the nanomaterial is embedded in the probe tip.

The probe 100 can be utilized in a scanning microscopy method comprising providing a 3D scanning microscopy probe 100, and performing a scanning microscopy operation with the 3D printed probe 100, wherein the scanning microscopy operation includes at least one of scanning probe microscopy (SPM), atomic force microscopy (AFM), profilometry, nanoindentation, nano-injection/aspiration, nano/micro-manipulation, fluidic sampling, or any other suitable microscopy operation, scanning operation, manipulation operation, or combination thereof. The variety of tip and cantilever designs as described above allow for a variety of applications to be performed.

In some embodiments, the method is performed with the probe 100 in air. In some embodiments, the method is performed with the probe 100 in liquid. In some embodiments, the method is performed with the probe 100 in contact mode. In some embodiments, the method is performed with the probe 100 in dynamic mode. In some embodiments, the method is performed with the probe 100 in peak force mode. In some embodiments, the method is performed on biological materials. In some embodiments, the method is performed on hard surfaces. In some embodiments, the method is performed for high-speed imaging. In some embodiments, the method is performed for high resolution imaging. In some embodiments, the method is performed for high-speed precision manipulation.

In some embodiments, the method is performed with a tip including CNT 105. In some embodiments, the method is performed on rough surfaces with a high-aspect ratio probe tip 110. In some embodiments, the method is performed in a multi-frequency scanning microscopy operation mode. In some embodiments, the method is performed on soft samples with a spring tip 115. In some embodiments, the method is performed with a cap tip 120 for cell compressibility measurements. In some embodiments, the method is performed with a colloidal tip 125 for cell viscoelastic measurements. In some embodiments, the method is performed on samples in microwells with a high aspect ratio colloidal tip 130. In some embodiments, the method is performed on samples in microwells with a high aspect ratio conical tip 135. In some embodiments, the method is performed with a shovel tip 140 for cell adhesion measurements. In some embodiments, the method is performed with a high aspect ratio puncture tip 145 for cell puncture and transfection measurements. In some embodiments, the method further comprises performing fluidic sampling with the probe 100. These applications are merely examples, and any scanning microscopy application known in the art can be performed by utilizing the 3D printed scanning microscopy probe 100.

EXPERIMENTAL EXAMPLES

The invention is now described with reference to the following Examples. These examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

3D printing is emerging as a powerful tool competing with traditional manufacturing techniques in various fields. 3D printing has revolutionized manufacturing, by increasing focus on design, reducing manufacturing steps, and minimizing the time to materialize design ideas. AFM has evolved as a very important scientific tool in different fields. Two photon polymerization (TPP), as a 3D printing technique, was utilized in the production of multifunctional AFM cantilevers with custom application specific probes 100.

In this developed framework, probe 100 fabrication is in 3D and not 2D, and thus more functional geometries can be produced to allow for a better control over the probe key parameters, such as resonance frequency, quality factor, and the spring constant. Furthermore, 3D finite element parametric analysis is performed to compare 3D printed probes 100 to Si probes in terms of resonance frequency, spring constant, and the stored elastic energy. The simulation results suggest that 3D printed SU8 probes 100 can achieve higher frequency modes compared to Si probes (with effective quality factors), unprecedented spring constants (softer than Si cantilevers), and its key specs can be customized with a remarkable accuracy. Indeed, for example, the 3D printed AFM tips are characterized using a conventional AFM system, by performing a variety of measurements in various AFM modes, under different environmental conditions, and on various characteristic materials. This characterization provides a direct insight on the performance of these novel probe designs with the conventional ones, as described in the experimental examples.

Figure 26A:
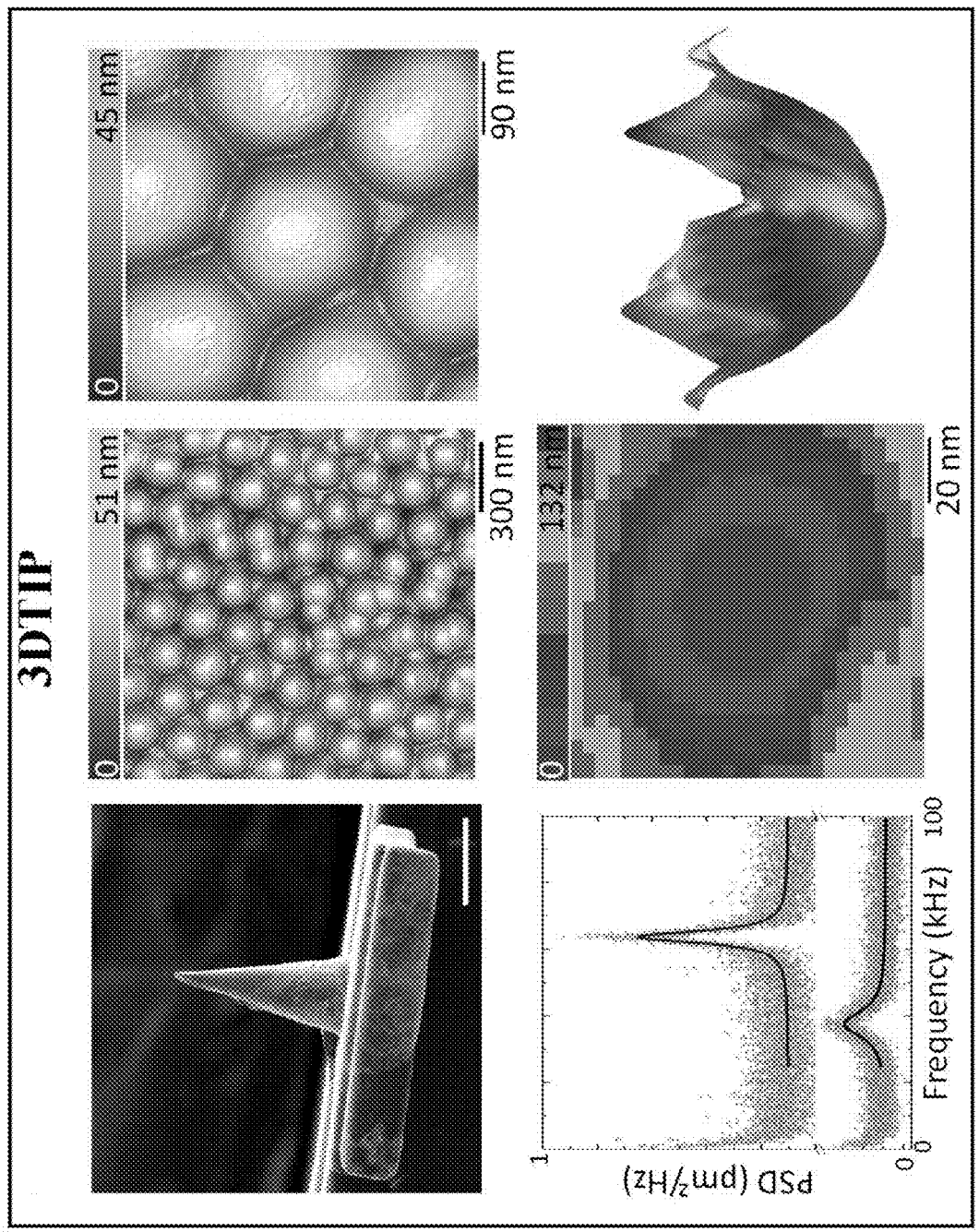
FIGS. 26A and 26B depict example AFM imaging performed by the example probes in accordance with some embodiments.
Figure 26B:
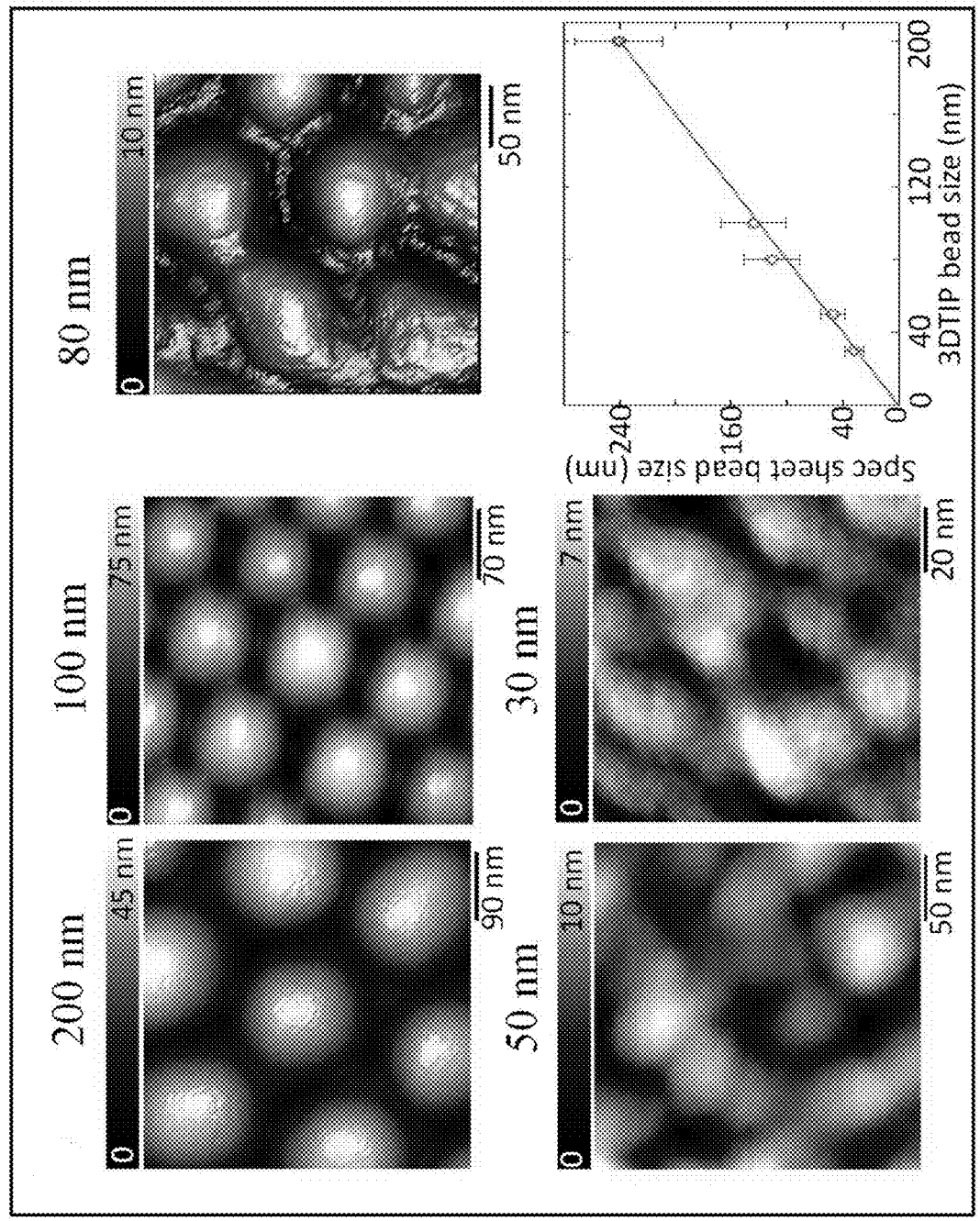
Figure 27:
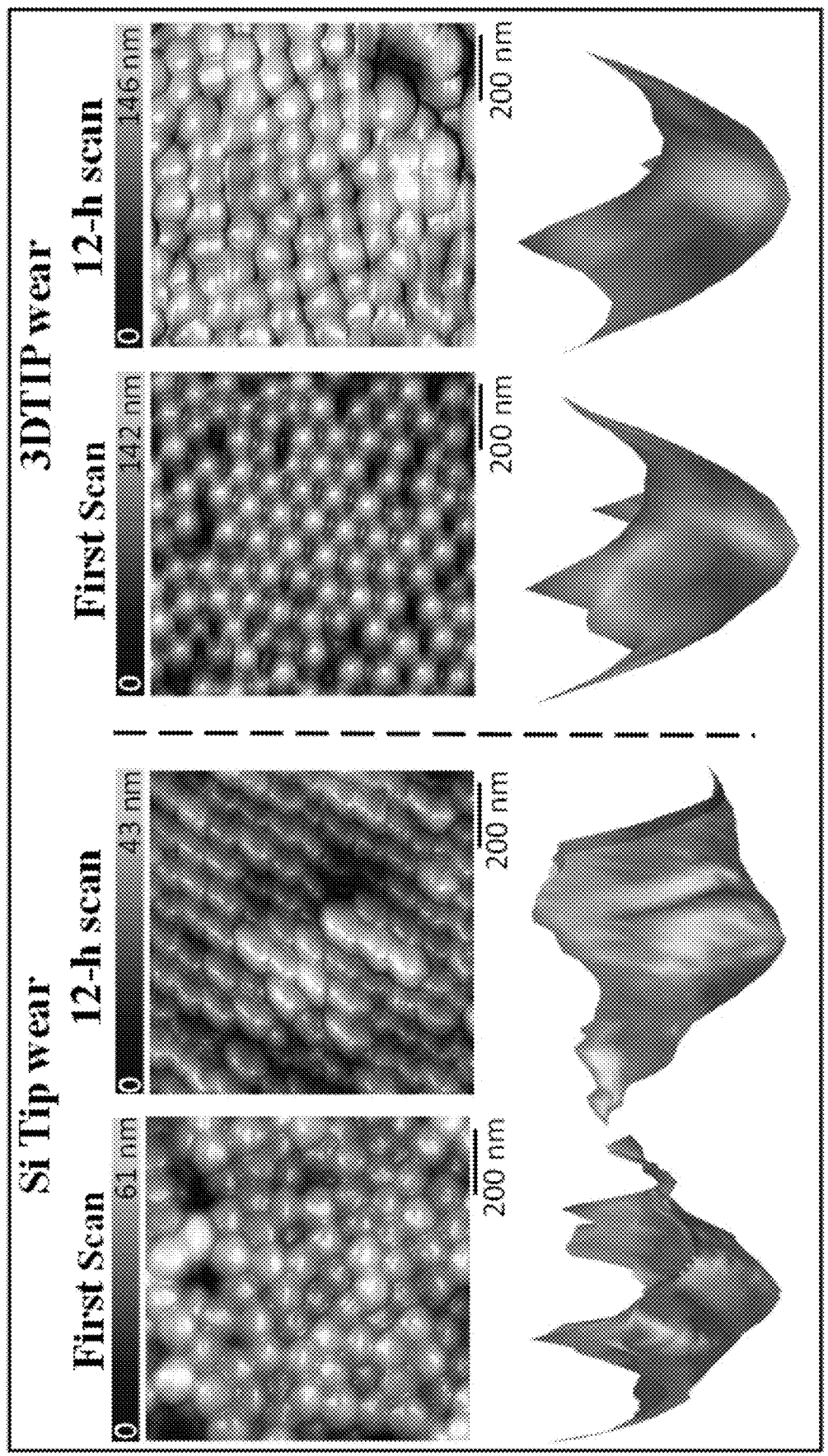
FIG. 27 depicts example experimental data comparing silicon probes to the example 3D printed probes in accordance with some embodiments.

FIGS. 26 and 27 show example AFM imaging results of 100 nm polystyrene beads with the probe 100. FIG. 26A shows an SEM image showing height sensor images (top middle and top right) obtained with probe 100 for 200 nm beads at different scales, a PSD versus frequency graph (bottom left) showing the first resonance mode of the probe 100 in air (gray points fitted with Lorentzian blue curve) and in liquid (blue points fitted with Lorentzian black curve), and a reconstructed bottom and side view (bottom middle and bottom right) of the probe 100 tip shape by deconvolution. FIG. 26B shows, from left to right, height sensor images obtained with the probe 100 for PSLs with d=200, 100, 80, 50, and 30 nm, and a plot of the PLS size from specification sheet (obtained from the manufacturer) versus the AFM measured PSL size obtained using the probe 100.

FIG. 27 shows a comparison of the tip wear between the probe 100 and a standard commercially available silicone probe while imaging the polystyrene beans. The left half of FIG. 27 shows the first (top left) and the last (top right) height sensor images after 12 hours continuous imaging of 100 nm beads obtained with a silicone tip, and their corresponding reconstructed tip shapes (bottom), while the right half of FIG. 27 shows the first (top left) and the last (top right) height sensor images after 12 hours continuous imaging of 100 nm beads obtained with the probe 100, and their corresponding reconstructed tip shapes (bottom).

The polystyrene beads were imaged with a tip diameter of 100 nm, in contact and dynamic modes, using the probe 100. The goal was to demonstrate how the probe 100 is functional, endures scanning without tip wear, and can produce high vertical and lateral resolution images in contact and dynamic modes. First, the beads were immobilized on a glass slide, and scanned in contact and dynamic modes using a 3D printed SU8 cantilevers with a conical tip. Then, for comparison, a similar spot is scanned in contact mode using a commercial Si probe, and imaged using the SEM. The height and indentation scan images illustrate the remarkable vertical and lateral resolutions achieved with the probe 100. Indeed, the measured mean size of the beads and their standard deviation both lie within the values obtained by the beads manufacturer (size is 100-120 nm, with a standard deviation of 5-15 nm). In addition, scan images acquired by probe 100 measured a size of the beads that was closer to the manufacturer commercial values than the measurements provided by the Si probes and the SEM.

The reason for obtaining better vertical and lateral resolution is attributed to the high aspect ratio of the conical probe tip 110. Moreover, adhesive forces in SU8 tips are significantly smaller, which results in a much smaller effective tip radius than Si tips. Furthermore, amplitude, phase, and height images of the beads were acquired in dynamic mode, continuously, for a duration of 12 hours (20 scans). The results suggest that the contrast in the phase images clearly distinguishes between the beads and the glass substrate materials. In addition, interestingly, after performing 20 scans for a duration of 12 hours, the resolution of beads increased, while the substrate becomes blurry in comparison to the first scan image.

Figure 28A:
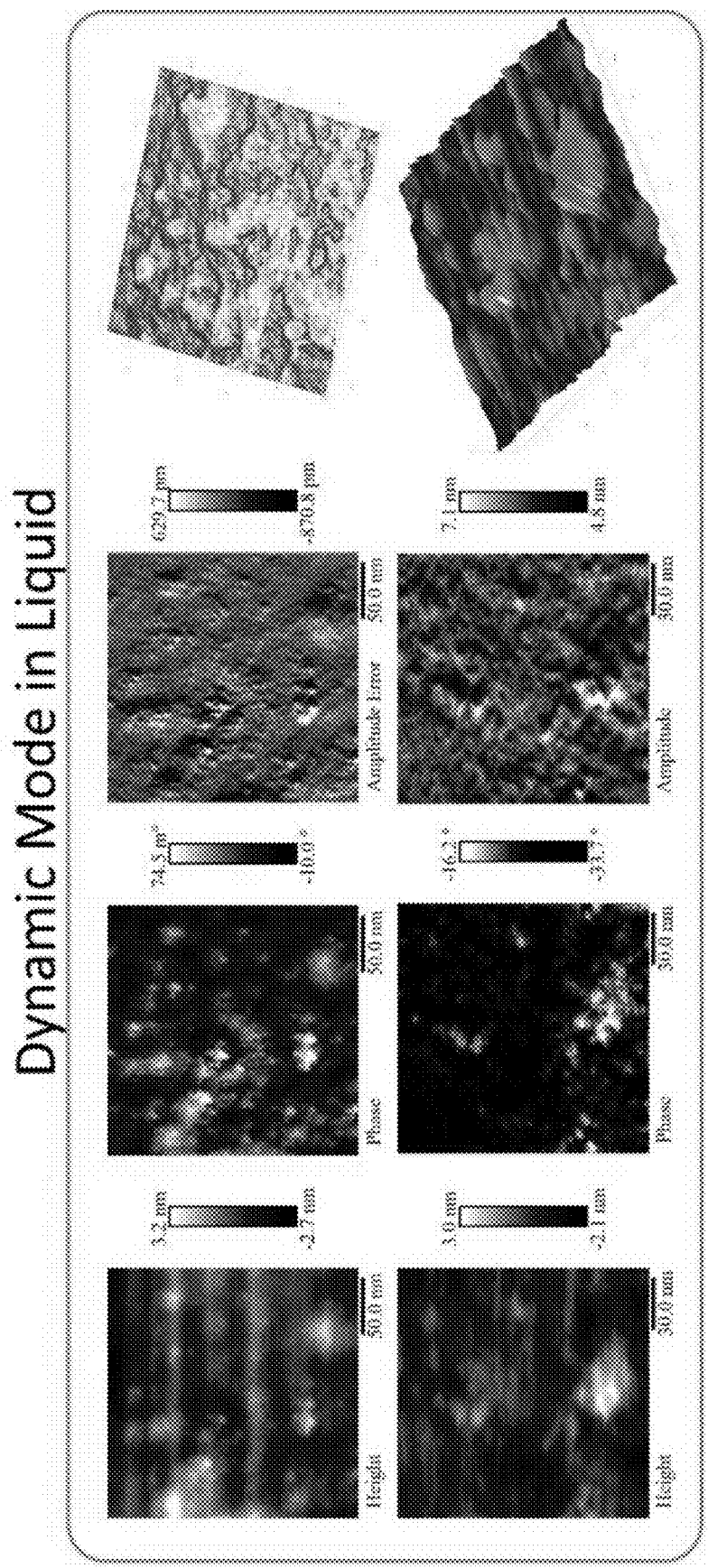
FIGS. 28A and 28B depict example experimental probe applications in accordance with some embodiments.
Figure 28B:
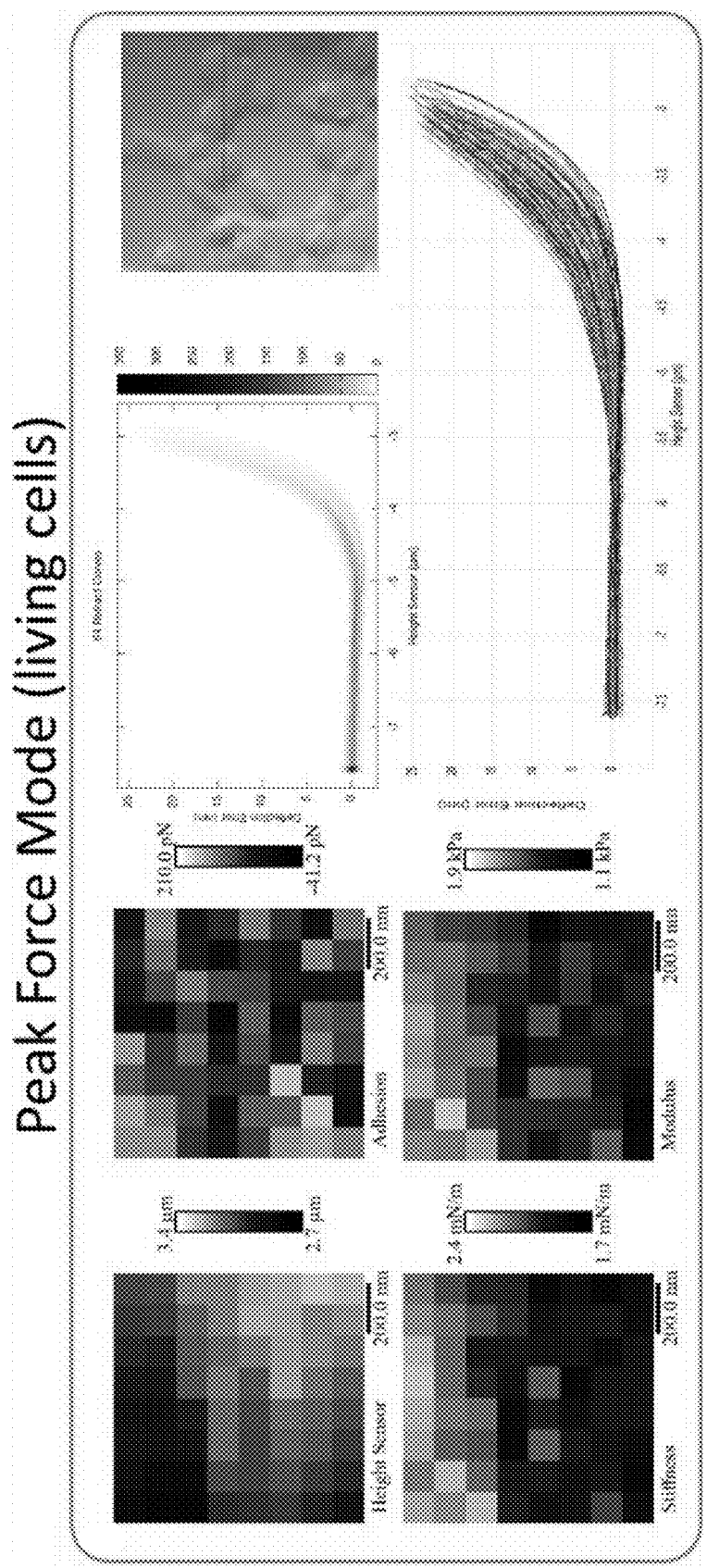

FIGS. 28A and 28B show example applications for use of the 3D printed AFM probe 100 in a biological setting. The example shows dynamic mode imaging in liquid, force spectroscopy, and force volume maps. FIG. 28A shows the height, phase, amplitude, and 3D height reconstruction images of immobilized anti-Epithelial Cell Adhesion Molecule (EpCAM) antibodies obtained by the probe 100 imaging in liquid. FIG. 28B shows the height, adhesion, stiffness, and modulus maps obtained by performing a force volume measurement of the upper left edge of an LNCaP cell. 64 force curve measurements were acquired mapping 1 $\mu m^2$ cellular area. The 64 force measurements versus distance are reconstructed and combined showing the overall distribution of forces acting on the cell surface.

A glass substrate was created with anti-Epithelial Cell Adhesion Molecule EpCAM antibodies and immobilized LNCaP cells (prostate cancer cell line) using a microfluidic device. After cell capture, the substrate was transferred to the AFM platform. A high aspect ratio probe tip 110 was used to perform scans on the antibody-coated glass slide first, in areas without cells. This experiment is essential to confirm the presence and the distribution of EpCAM antibodies on the glass substrate, and to demonstrate the robust performance and high-resolution imaging of the probe 100 in liquid. A significant decrease in the noise levels, and a major increase in the vertical and lateral resolution was observed. For instance, the result in FIG. 25 shows that while the contrast of the phase images clearly illustrates the difference between the antibodies and the substrate's chemistry, the amplitude and the height images distinctively show their commonly reported triangular shape and their height (2-6 nm). Next, using a colloidal probe tip 125, force volume measurements were performed on the immobilized LNCaP cells to map their viscoelastic, stiffness, and adhesion properties. The upper left corner of an LNCaP cell was mapped in peak force mode, and 64 force curves were acquired mapping 1 $\mu m^2$ cellular area. From the 64 acquired force curves, height, adhesion, stiffness, and modulus maps are generated illustrating the morphology and the mechanical properties of the upper left corner of the cell. The reason for choosing the corner of the LNCaP cell is to illustrate how the mechanical properties of a cell change from its center to its edges. For instance, cells are expected to be stiffer at the edges due to their small thickness and the relatively larger contribution of the glass substrate.

The results in FIGS. 28A and 28B clearly show two distinct regions that could be identified in the height map, where the edge of the cell is in the upper left corner, while the lower right corner goes toward the center of the cell. In parallel with expectations, the modulus and stiffness maps confirm that the edge of the cell represented by the upper left corner is 60% stiffer and shows an 80% increase in the modulus in comparison to the lower right corner that is toward the center of the cell. Furthermore, all 64 force curves were combined to obtain an overall density distribution of the forces acting on the cell.

Figure 29A:
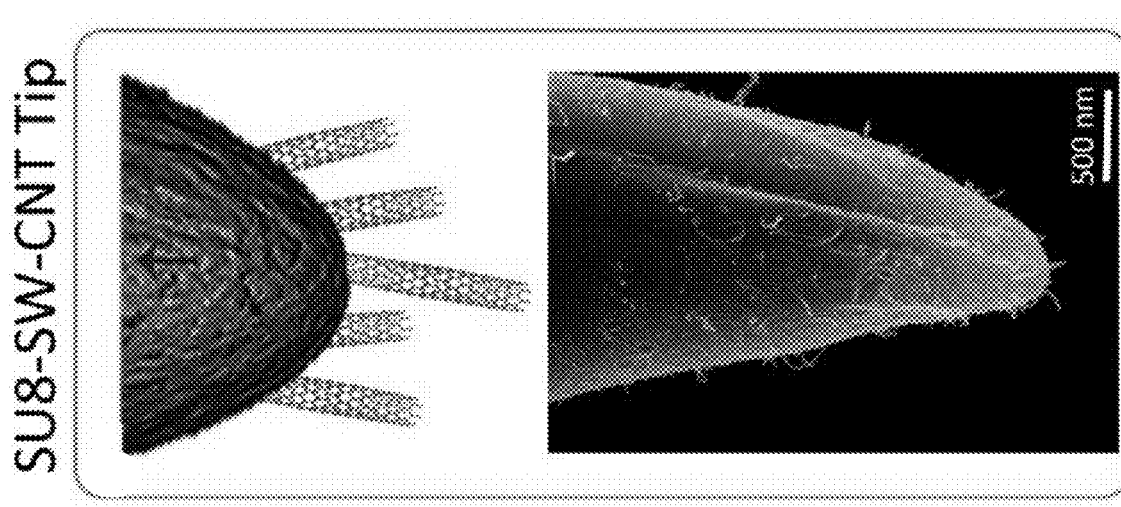
FIGS. 29A-29C depict properties of the example probe in accordance with some embodiments.
Figure 29B:
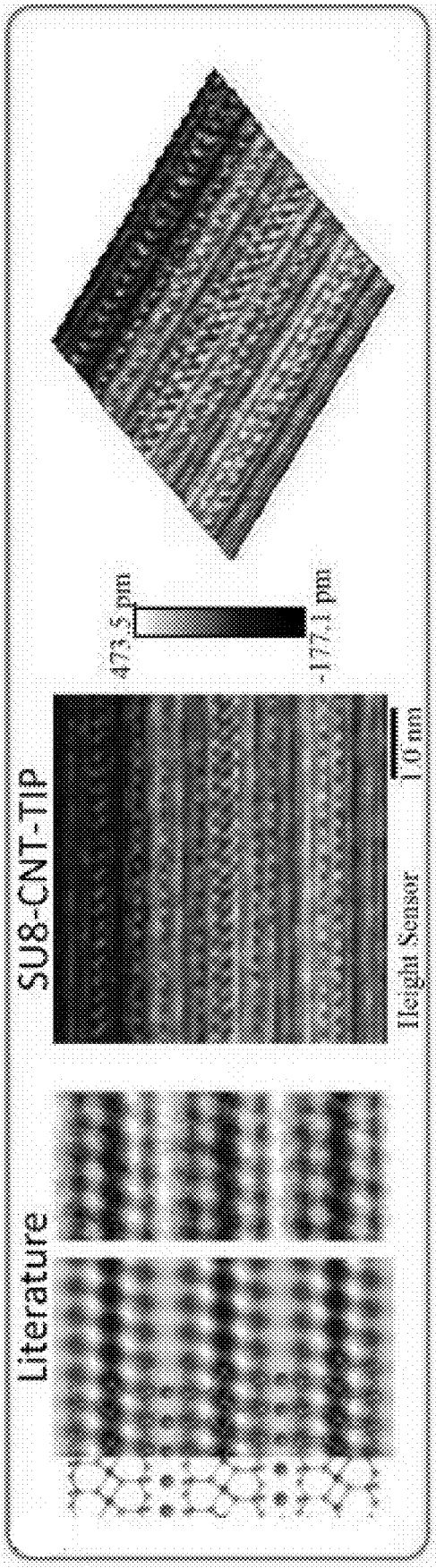
Figure 29C:
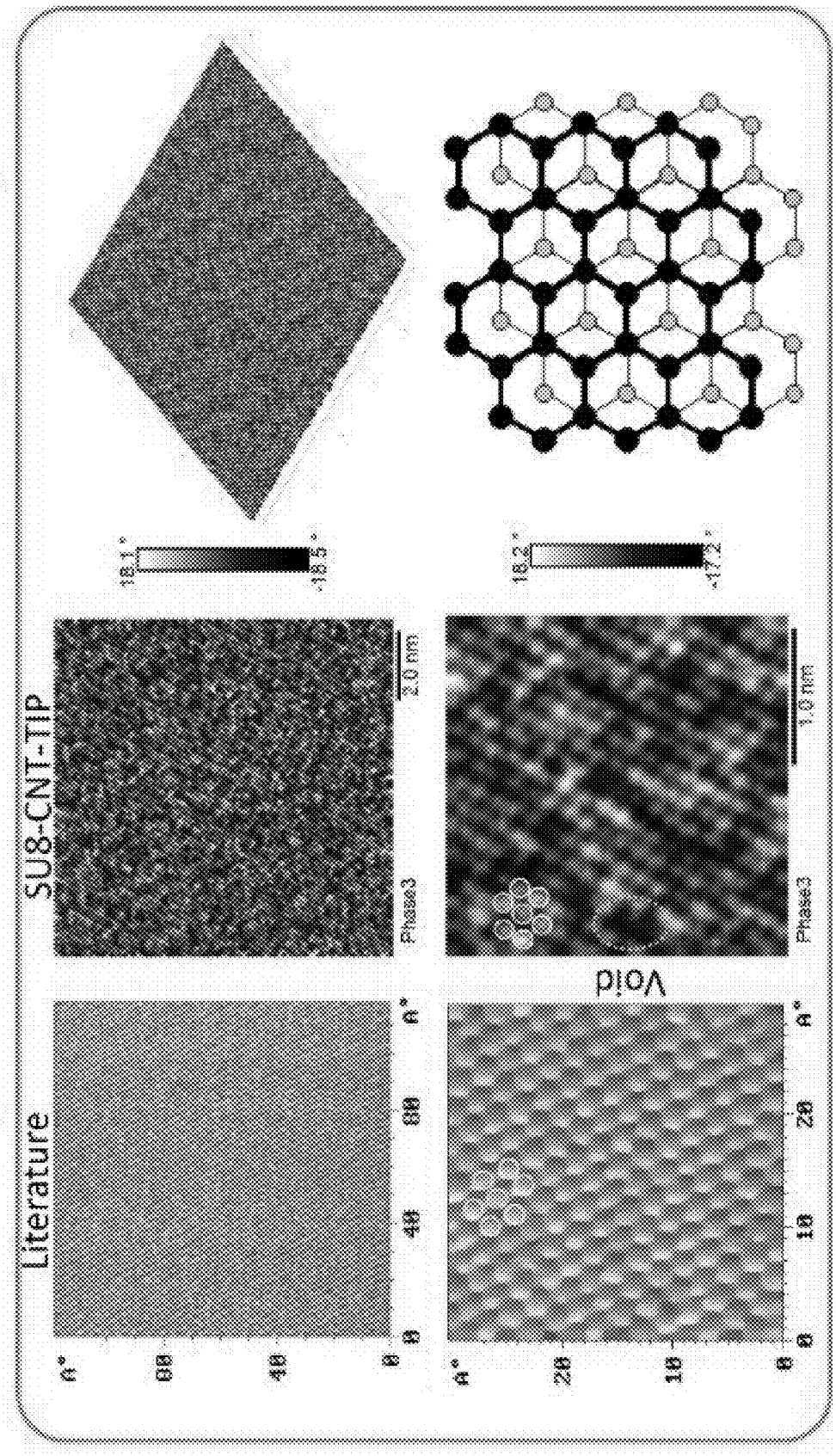

FIGS. 29A-29C show apparent and true atomic resolution achieved by the probe 100 with a CNT tip 105 on Mica and HOPG immersed in liquid. FIG. 29A shows a schematic showing how the CNTs are inserted into the soft and porous SU8 tip end (top) and a SEM image of CNTs mounted on an AFM tip (bottom). FIG. 29B shows a Mica atomic resolution obtained by high-resolution transmission electron microscopy (TEM) reported from the literature (left), a Mica atomic resolution height image obtained by the example AFM probe tip with CNTs 105 (middle), and a Mica atomic resolution 3D height image obtained by the CNT tip 105 (right). FIG. 29C shows the apparent atomic resolution of HOPG obtained by AFM reported from the literature (left), a HOPG true atomic resolution height image obtained by the CNT tip 105 (middle), and a HOPG true atomic resolution 3D height image obtained by the CNT tip 105 (right). As shown, the CNT tip 105 can image in better detail and provides insight to structures such as voids.

The SU8-CNT probe tip 105 achieves true atomic resolution with the integration of SW-CNTs. Because the 3D printed SU8 tips are soft and porous, the insertion and fixation of the strong SW-CNT (100 times harder than steel) is achievable. To confirm the presence of the inserted CNTs on the probe tip 105, multiple frequency peaks initiated from the same range of the probe resonance frequency are observed. This is a clear indication that at the probe tip 105 end there are multiple CNT attached, with one being the furthest most reaching. Scanning in dynamic mode, in liquid, on Mica and HOPG samples was performed since they are known to be atomically flat materials. The scan size was gradually reduced, and the scan rate was adjusted based on the resonance frequency and the scan size. FIG. 29B shows the Mica's atomic resolution obtained by TEM (left) and the atomic resolution obtained by the probe 100. Distinct atomic structure can be observed and compared to the one obtained by the TEM images.

Furthermore, in FIGS. 29C, which represent a true atomic resolution of HOPG obtained by the developed probe 100, one can clearly observe a lattice structure, lattice distances, and atomic packing that resembles HOPG. Additionally, what seems to resemble voids all around the sample was observed, which further confirms our achieved true atomic resolution.

Figure 30A:
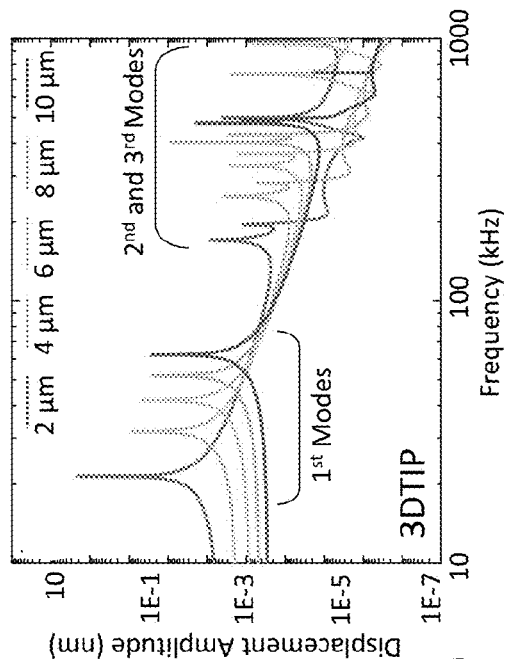
Figure 30B:
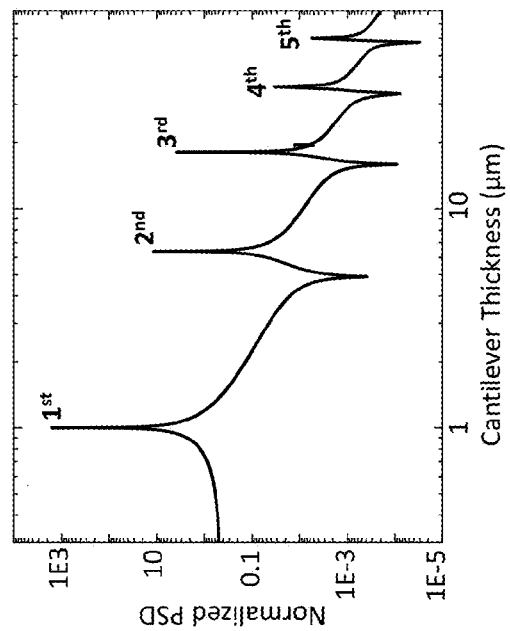
Figure 30C:
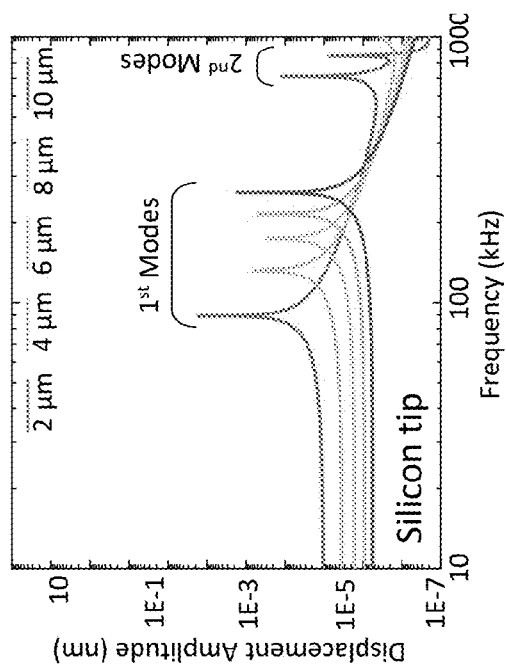
Figure 30D:
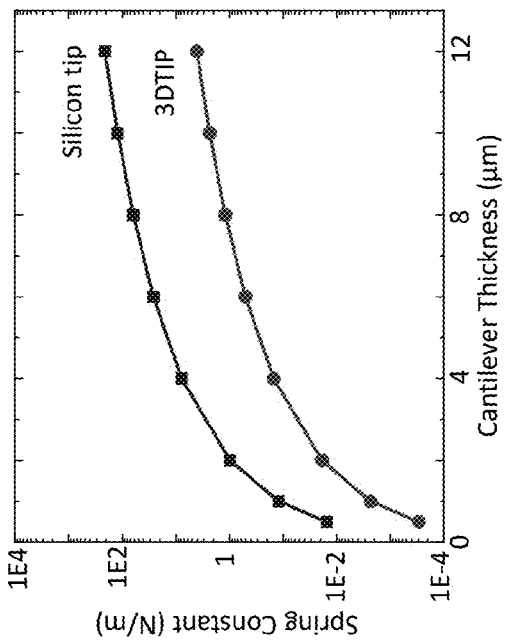

FIGS. 30A-30H show example simulation results of a parametric analysis comparing SU8 probes 100 and Si-based probes. FIG. 30A shows simulation results of displacement amplitude versus the frequency for a range of Si cantilever thickness showing mostly a single frequency mode. FIG. 30B shows simulation results of displacement amplitude versus the frequency for a range of Probe 100 cantilevers 155 showing two frequency modes. FIG. 30C shows spring constant versus cantilever thickness for Si probes (blue) and for SU8 (3DTIP) probe 100 (orange). FIG. 30D shows amplitude response versus normalized excitation modes for the probe 100. FIG. 30E shows AFM measured power spectral density (PSD) versus frequency for a Silicon tip (t=2.4 μm) showing with a Lorentzian fit its first oscillation mode. FIG. 30F shows AFM measured power spectral density (PSD) versus frequency for probe 100 showing with a Lorentzian fit, the first oscillation mode for probe 100 with t=10 μm (n=5) and the second oscillation mode for probe 100 with t=2 μm (n=4). FIG. 30G shows AFM measured power spectral density (PSD) versus frequency for probe 100 in air (gray points) and liquid (blue points), shown with a Lorentzian fit, and the first oscillation mode for probe 100 with t=10 μm. FIG. 30H shows AFM measured power spectral density (PSD) versus frequency in air, shown with a Lorentzian fit, showing multiple oscillation mode for probe 100 with t=10 μm.

Figure 31A:
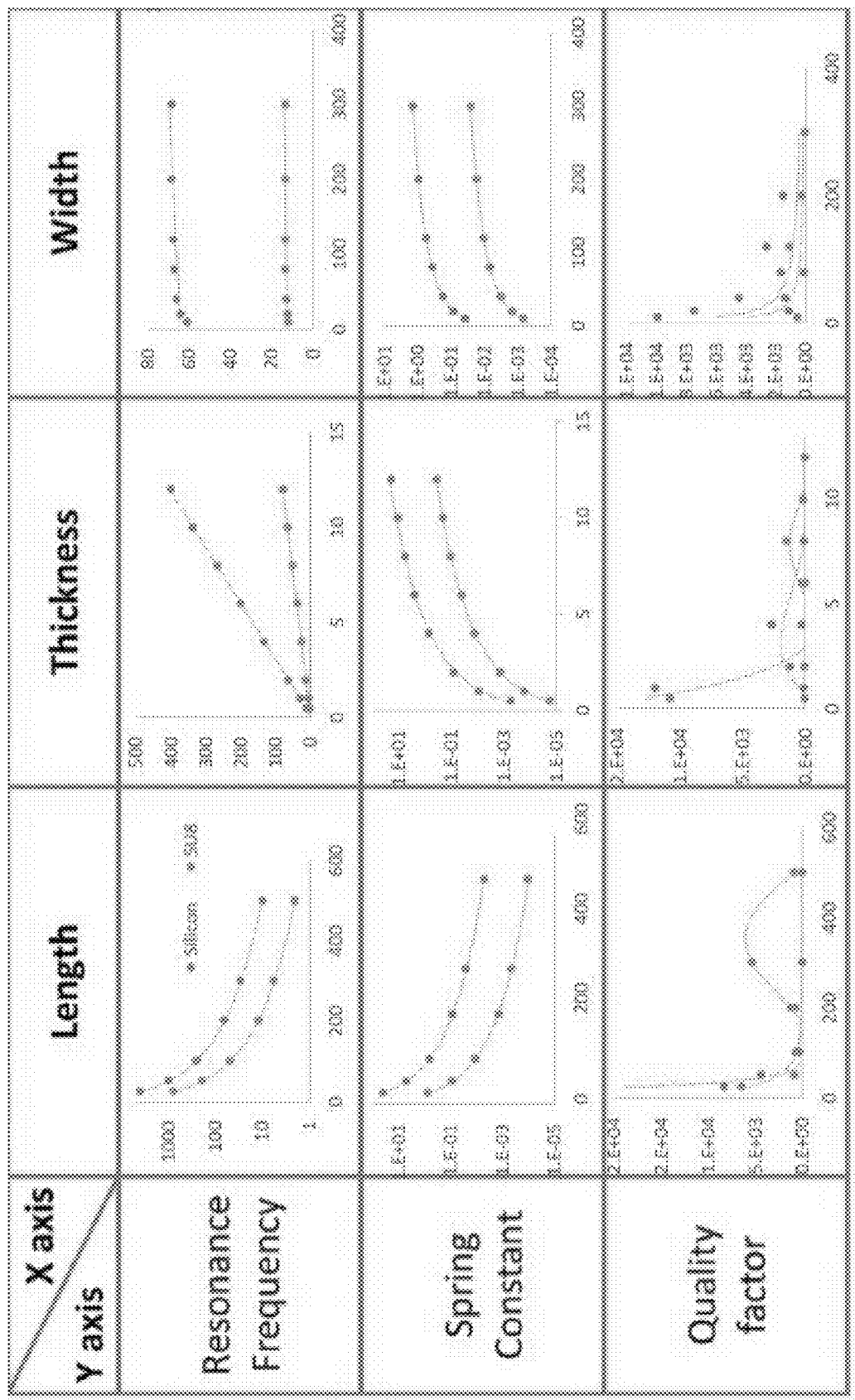
FIGS. 31A-31B depict simulated and experimental performance of an example probe in accordance with some embodiments.
Figure 31B:
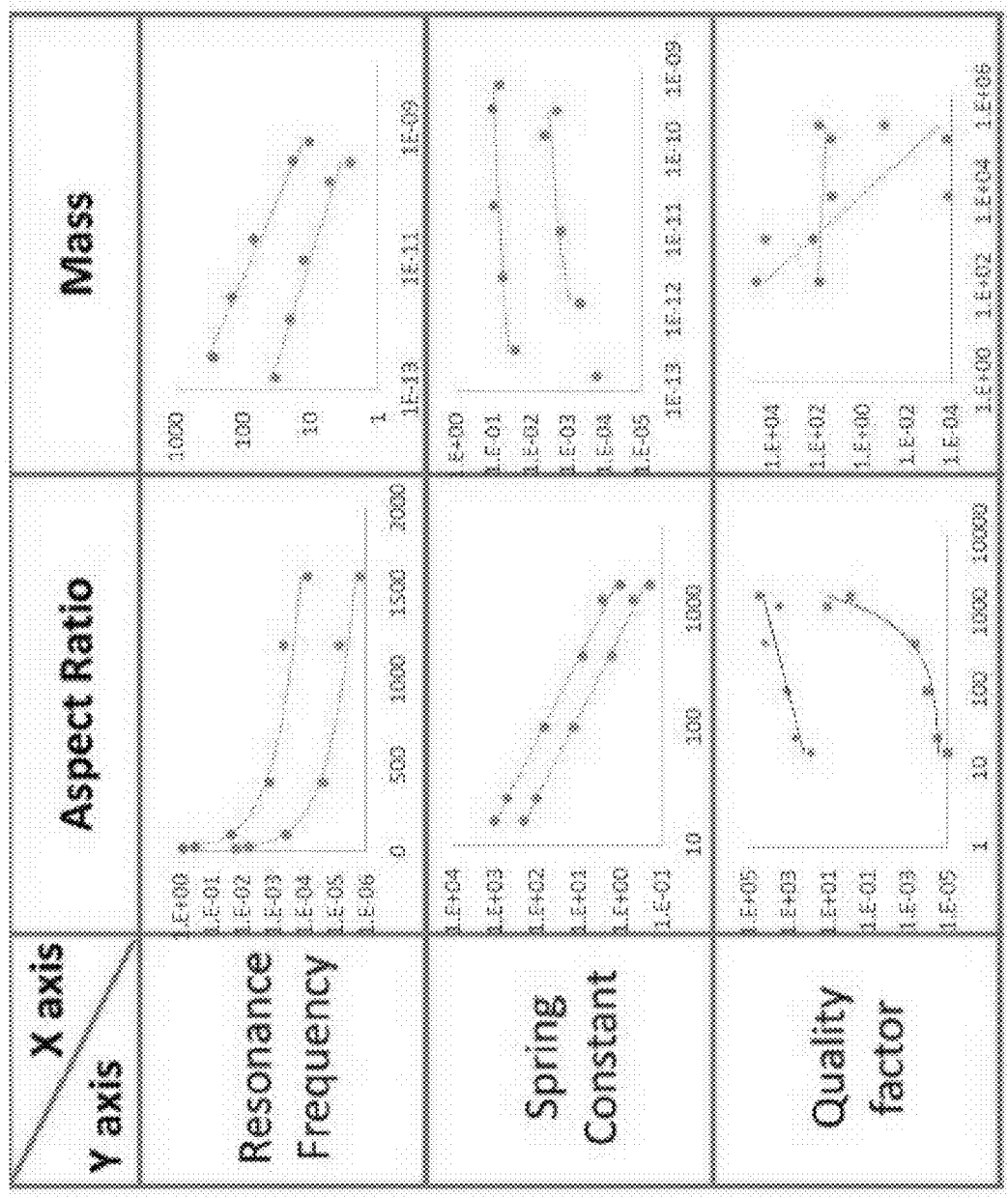

FIGS. 31A-31B show additional example simulation results of the parametric analysis comparing SU8 probes 100 and Si-based probes. The plots illustrate the effect of varying the length, thickness, width, aspect ratio and the mass of the cantilever on its resonance frequency, spring constant, and quality factor (Si in blue and SU8 in orange).

The results show that the 3D printed probe 100 can achieve higher frequency modes and unprecedented spring constants (softer cantilevers) compared to Si probes. Additionally, the key specifications of the probe 100 can be customized with remarkable accuracy. As shown above, 100 nm polystyrene beads can be imaged in contact and dynamic modes, both in air and in liquid. The resulting image scans give a better resolution by revealing the actual size of the beads (per manufacturer specifications), thus surpassing resolutions obtained by Si probes and SEM images. Moreover, the probe 100 shows excellent resistance to tip wear for a duration of 12 hours. The enhanced lateral and vertical scan resolutions are mainly attributed to the achieved high aspect ratio of the conical tip 110 and the minimal tip-to-bead adhesive forces (SU8 material), which all resulted in smaller effective tip radius compared to Si probes.

The probe 100 are fabricated out of SU8 using a 2-photon 3D printing (Nanoscribe Photonic Professional GT2). Hence, in addition to traditional AFM tip designs (with 2D Si micromachining), more functional geometries are produced to better control each probe's key parameters, such as the resonance frequency, quality factor, and spring constant. 3D finite element parametric analysis (COMSOL Multiphysics) was performed to analyze the probes 100 in terms of resonance frequencies and spring constants. Furthermore, the manufactured probes 100 were characterized using a commercial AFM (Bruker Dimension Icon) by performing a variety of measurements in different working modes and environments, and on various characteristic materials. The measurements provide a direct insight on the performance of the novel 3D Tips in comparison to the conventional Si probes.

The SU8-CNT AFM probe tips 105 are multifunctional and suitable for all AFM modes and for various experimental measurements. For instance, contact and dynamic modes are possible in air and liquid environments. Additionally, the probes 100 are suitable for probing soft biological materials as well as hard and rough surfaces with minimal wear in comparison to silicon tips. Furthermore, with the SU8-CNT AFM probe tips 105, it is possible to excite more and higher order frequencies than their respective silicon tips, which opens new venues for multi-frequency AFM operation modes. With this invention custom making of 3D printed AFM tips will be a routine practice that could substitute the conventional silicon tip.

As an example, a complete comparative analysis of the 3D printed SU8 AFM tip to the conventional Si tips was performed. The main goal of this study was to map the effect of varying the cantilever design based on length, width, thickness, aspect ratio, mass, and material, on the key cantilever parameters such as the spring constant, resonance frequency, and the quality factor. The geometry of the cantilever is reconstructed in a way that resembles the commercially available silicon ones, then further enhanced to show how 3D printing can overcome Si manufacturing limits.

First it was demonstrated that for similar cantilever geometry, 3D printed SU8 cantilevers can be excited at three eigen-frequencies versus two for Si cantilever, within frequencies up to 1 MHz. This means that 3D printed SU8 cantilever can be excited with higher modes of resonance than Si cantilever, which can still be measured by the ordinary AFM setups (limited to 2 MHz). These observed results open new possibilities in the field of multifrequency AFM. The key experimental parameters, such as the resonance frequency (all observed orders), the spring constant, and the quality factor can be customized by simply varying the 3D printed cantilever geometrical design. Although the relationship between the geometrical design and the experimental parameters shows similar trends for 3D printed SU8 and the conventional Si cantilevers, there is an order of magnitude reduction in the resonance frequency by varying the length, aspect ratio, and mass. Also, a slope reduction by varying the thickness, and a constant reduction by varying the width of the cantilever. The conclusion to be drawn from these findings is that 3D printing using SU8 not only can be parametrically customized for all ranges of experiments but can also achieve unprecedented spring constants (softer than Si cantilevers), higher frequency modes (with effective quality factors), and can be designed to achieve any desired 3D geometry. Such findings can improve the AFM contribution to biology, where samples such as cell need to be probed with extremely soft cantilevers and can enhance AFM dynamic mode in fluid.

Figure 32:
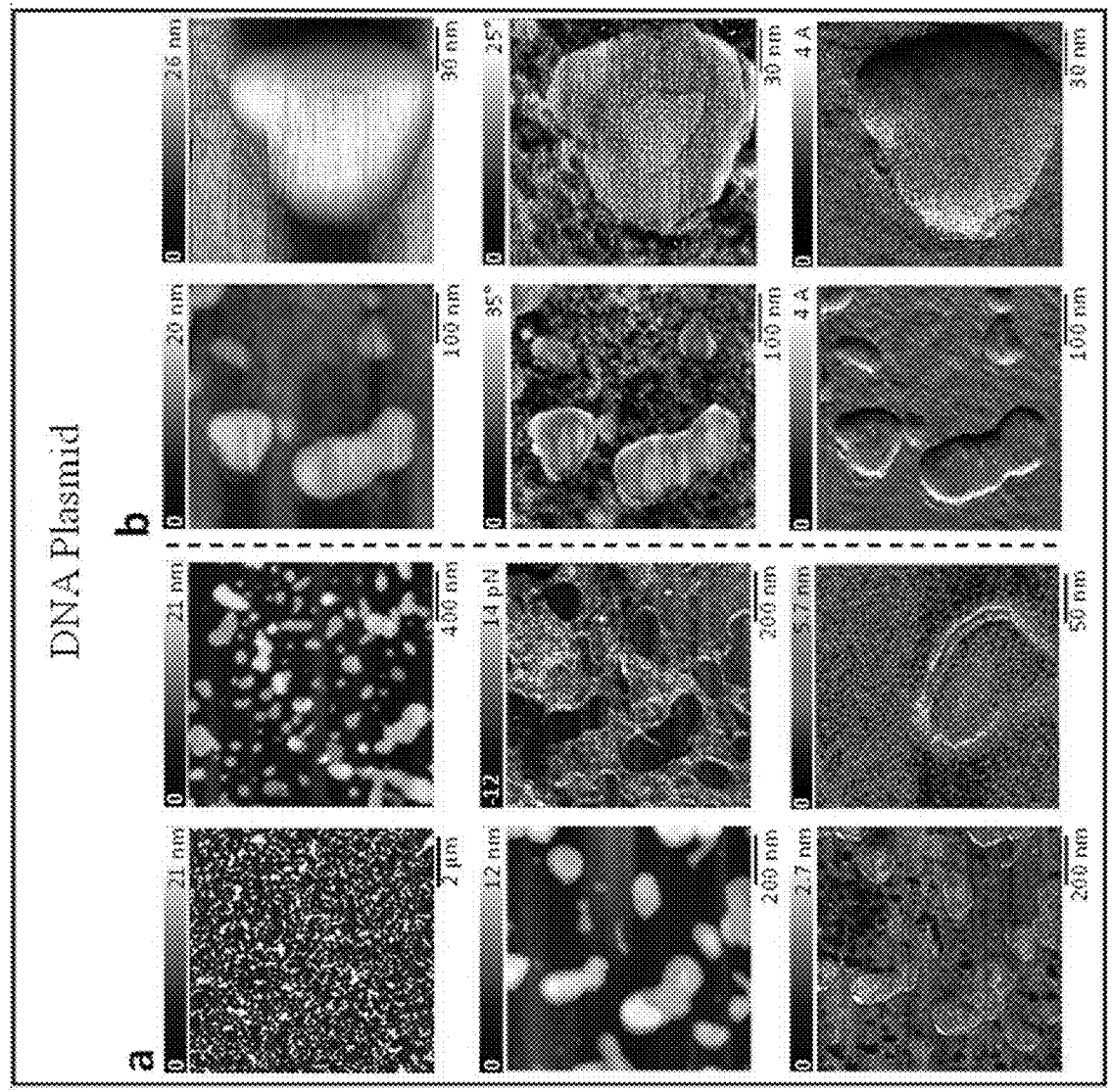
FIG. 32 depicts example AFM imaging performed by the example probes in accordance with some embodiments.

FIG. 32 depicts an experimental example of AFM imaging performed by the probe 100. The images show the peak force and dynamic mode imaging of plasm id DNA. Section A shows the AFM height sensor, adhesion, and deformation images of plasmid DNA obtained using the probe 100 in peak force mode. Section B shows the AFM height sensor, phase, and amplitude images of plasmid DNA obtained using the probe 100 in dynamic mode.

Figure 33:
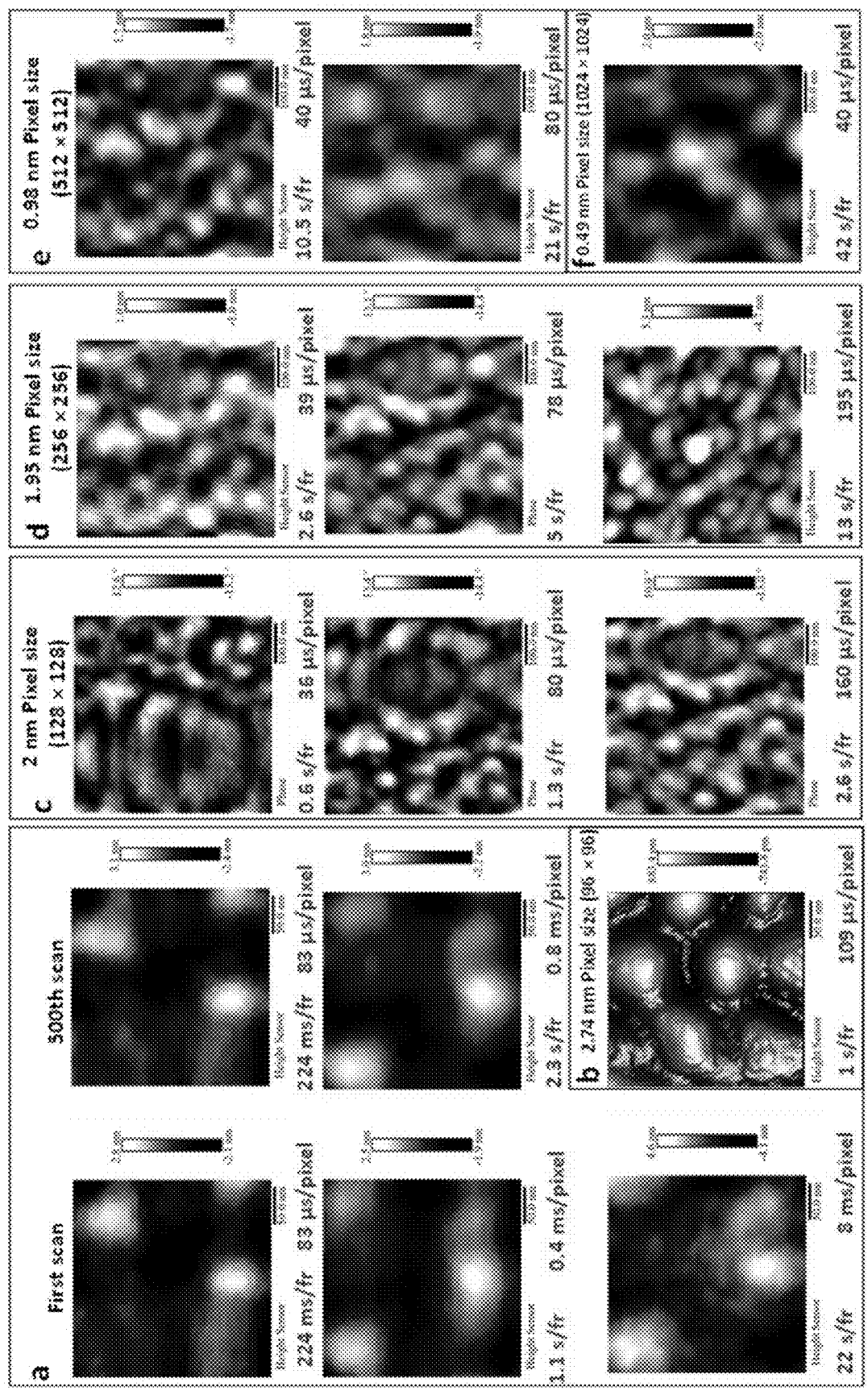
FIG. 33 depicts example AFM imaging performed by the example probes in accordance with some embodiments.

FIG. 33 depicts an experimental example of high-speed imaging performance of the probe 100. Section A shows the first (top left) and the 500th scan (top right) producing a height sensor image of 50 nm PSLs. The images were achieved with a 195 Hz scan rate, for a 263×263 nm$^2$ scan area, and 52×52 pixels. Section A also shows height sensor images of 50 nm PSLs, achieved with 46 Hz (middle left), 23 Hz (middle right), and 2.4 Hz (bottom left) scan rates. Section B shows height sensor image of 80 nm PSLs, achieved with an 86.6 Hz scan rate, for a 263×263 nm$^2$ scan area, and 96×96 pixels. Section C shows phase images of 30 nm PSLs, achieved with 195 Hz (top), 97.5 Hz (middle), 48.8 Hz (bottom) scan rates, for a 500×500 nm$^2$ scan area, and 128×128 pixels. Section D shows height sensor and phase images of 30 nm PSLs, achieved with 97.5 Hz (top), 48.8 Hz (middle), 19.5 Hz (bottom) scan rates, for a 500×500 nm$^2$ scan area, and 256×256 pixels. Section E shows height sensor images of 30 nm (top) and 50 nm (middle) PSLs, achieved with 48.8 Hz (top), 24.4 Hz (middle) scan rates, for a 500×500 nm$^2$ scan area, and 512×512 pixels. Section F shows height sensor image of 50 nm PSLs, achieved with a 24.4 Hz scan rate, for a 500×500 nm$^2$ scan area, and 1024×1024 pixels.

Figure 34:
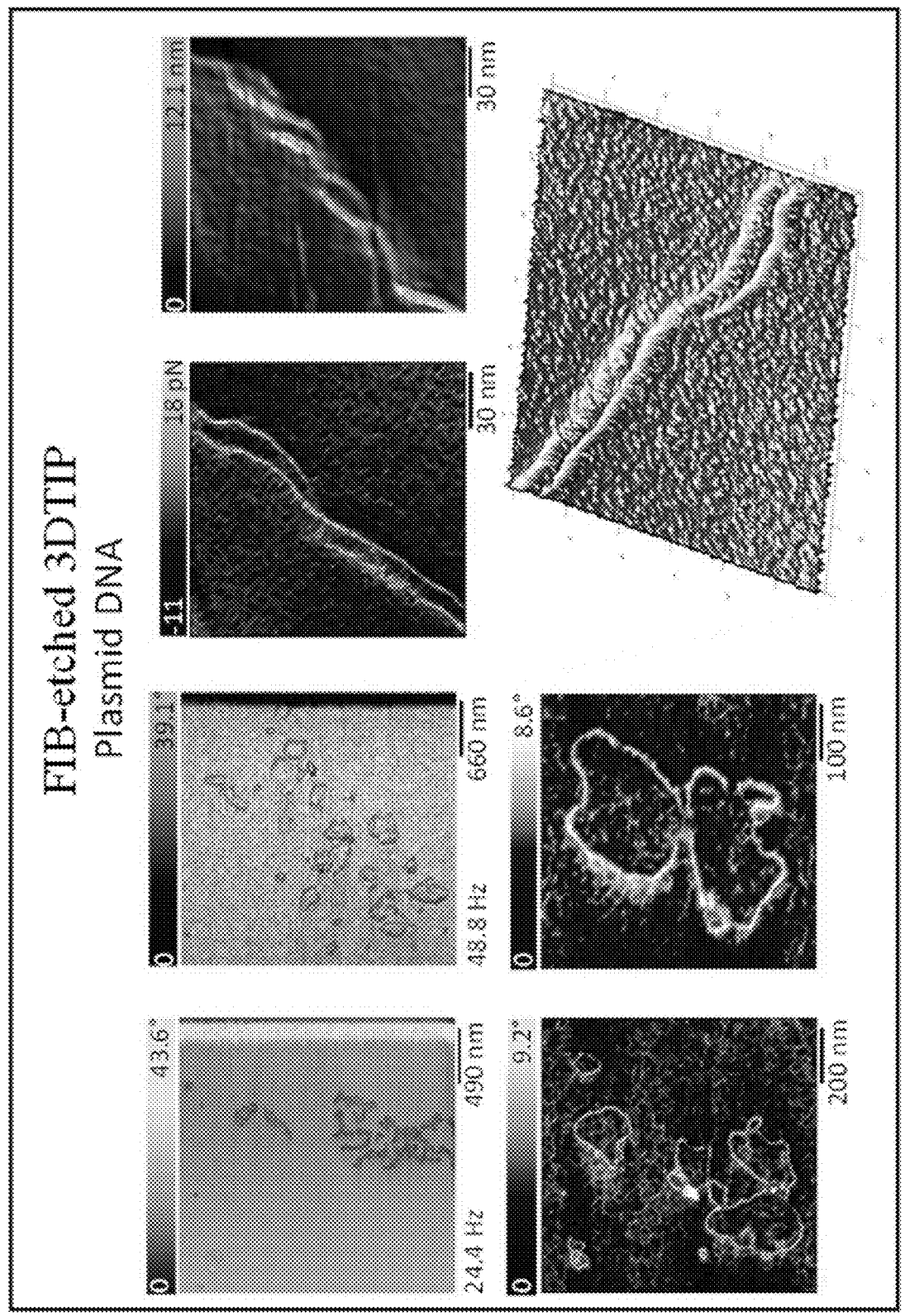
FIG. 34 depicts example experimental performance the example probes in accordance with some embodiments.

FIG. 34 depicts example experimental imaging performance and resolution limits for the probe 100. The AFM phase and height sensor images shown were obtained at different scales and scan rates, as identified on each image, and clearly show a plasm id DNA ring and supercoiled DNA.

Figure 35:
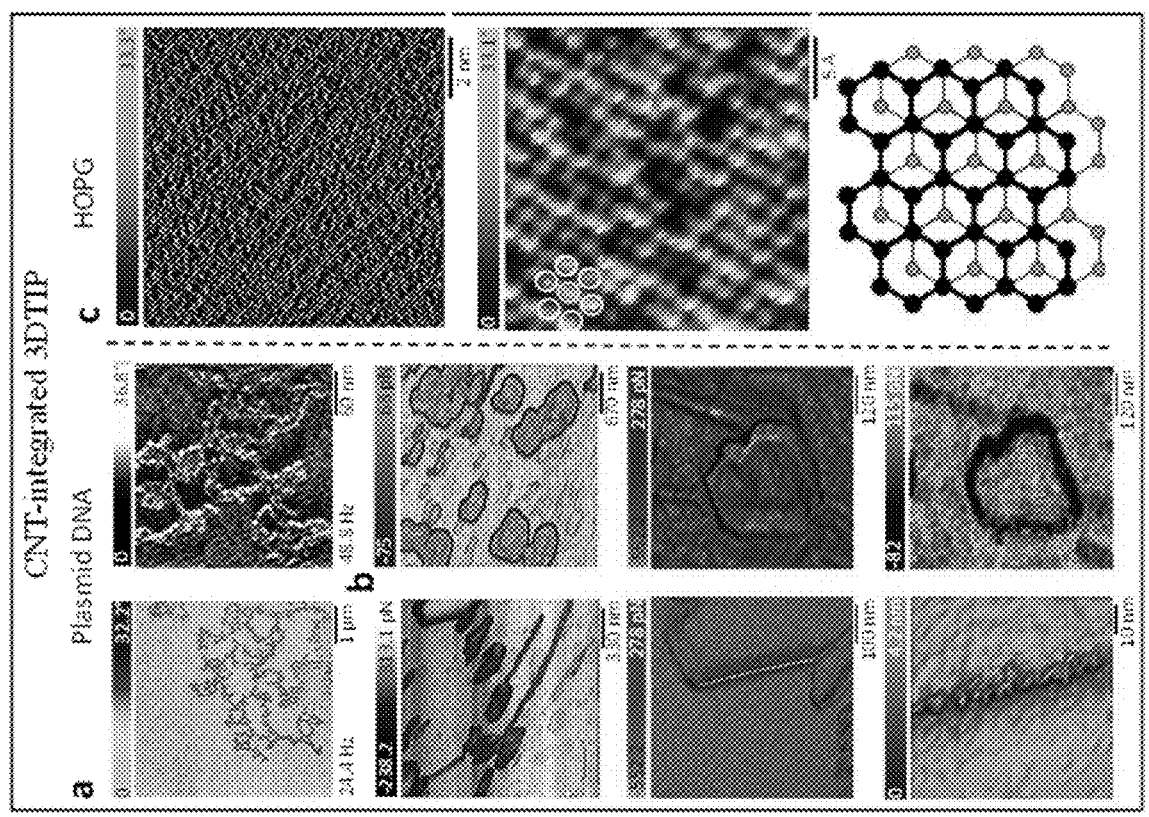
FIG. 35 depicts example experimental performance the example probes in accordance with some embodiments.

FIG. 35 depicts additional example experimental imaging performance and resolution limits for the probe 100. Section A shows AFM phase and height sensor images obtained at different scales and scan rates using a probe 100 with CNT tip 105, clearly showing DNA aggregates and plasmid rings. Section B shows AFM height, adhesion and peak force error images at different scales obtained using the probe 100 with CNT tip 105, clearly showing the plasm id DNA ring and the thickness of the DNA strand (~8.2 nm). Section C shows the true atomic resolution achieved by the probe 100 with CNT tip 105 on HOPG, showing hexagonal structure, point defects (voids), and an atomic distance of about 0.3 nm.

In conclusion, disclosed is a technology to manufacture scanning microscopy probes that integrate the use of SU8 resin with 2-photon 3D printing. The scanning microscopy probe can be designed in various shapes, with various 3D features, and can cover a wide range of spring constants. The tips are multifunctional, can be used with several scanning microscopy modes and experiments including AFM, profilometry, nanoindentation studies, fluidic sampling, or any other suitable microscopy application or combination thereof, and can further be explored for multi-frequency AFM operation modes. Custom-made tips will become a standard routine practice in the scanning microscopy experimental settings, potentially revolutionizing the field, and 3D printing will allow for easy manufacturing of custom tip geometries. This work shows that the customization of scanning microscopy probes is achievable with 3D printing. 3D printing is advantageous in the fact that complex geometries can be achieved, provides a large choice of materials, a one-step technic, and any slight modification to the design can be easily achieved. Due to the material of choice, i.e. SU8 and CNT-SU8, 3D printed tips are easier to handle, more moldable and design friendly, and allow certain working parameters that are difficult to achieve with the conventional silicon tip. This work provides new possibilities for what scanning microscopy imaging can achieve in simple settings and will expand its applicability in research.

Some of the example probes resemble the silicon based commercially available ones and can robustly function in all scanning microscopy modes and all environmental settings. Some of the example probes are custom designed and produced for unique scanning microscopy experiments that are otherwise impossible to achieve with traditional Si tips. In addition, the possibility to produce 3D printed scanning microscopy probes utilizing new materials, geometries and designs that cannot be obtained by the traditionally used Si scanning microscopy probe microfabrication techniques provides for better experimental results. For example, SU8 and CNTs were merged in the production of AFM probes tips 105 to obtain a single far-reaching CNT at its end. This design significantly enhances the vertical resolution due to the high aspect ratio of the CNT, as well as the lateral resolution due to the thickness of the CNT. With such a tip, true atomic resolution is now possible to achieve in ambient conditions and by a regular AFM platform. Additionally, fluidic elements can be implemented in the probes.

Further information can be found in the following references, included herein by reference:

Garcia, R., et al., Dynamic atomic force microscopy methods. Surface science reports, 2002. 47(6-8): p. 197-301.

Kogure, T., Investigations of micas using advanced transmission electron microscopy. Reviews in mineralogy and geochemistry, 2002. 46(1): p. 281-312.

Randall, J. N., et al., Atomically Precise Manufacturing: The Opportunity, Challenges, and Impact, in Atomic Scale Interconnection Machines. 2012, Springer. p. 89-106.

Binnig, G., et al., Surface studies by scanning tunneling microscopy. Physical review letters, 1982. 49(1): p. 57.

Binnig, G. and H. Rohrer, Scanning tunneling microscopy—from birth to adolescence. reviews of modern physics, 1987. 59(3): p. 615.

Ikai, A., STM and AFM of bio/organic molecules and structures. Surface Science Reports, 1996. 26(8): p. 261-332.

Binnig, G., C. F. Quate, and C. Gerber, Atomic Force Microscope. Physical Review Letters, 1986. 56(9): p. 930-933.

Giessibl, F. J., Advances in atomic force microscopy. Reviews of modern physics, 2003. 75(3): p. 949.

Garcia: R. and R. Perez, Dynamic atomic force microscopy methods. Surface Science Reports, 2002. 47(6): p. 197-301.

Butt, H.-J., B. Cappella, and M. Kappl, Force measurements with the atomic force microscope: Technique, interpretation and applications. Surface science reports, 2005. 59(1-6): p. 1-152.

Dimitriadis, E. K., et al., Determination of elastic moduli of thin layers of soft material using the atomic force microscope. Biophysical journal, 2002. 82(5): p. 2798-2810.

Giessibl, F. J., AFM's path to atomic resolution. Materials Today, 2005. 8(5): p. 32-41.

Binnig, G., et al., 7×7 Reconstruction on Si(111) Resolved in Real Space. Physical Review Letters, 1983. 50(2): p. 120-123.

Binnig, G., et al., Atomic Resolution with Atomic Force Microscope. Europhysics Letters (EPL), 1987. 3(12): p. 1281-1286.

Albrecht, T. R. and C. F. Quate, Atomic resolution imaging of a nonconductor by atomic force microscopy. Journal of Applied Physics, 1987. 62(7): p. 2599-2602.

Meyer, G. and N. M. Amer, Optical-beam-deflection atomic force microscopy: The NaCl (001) surface. Applied Physics Letters, 1990. 56(21): p. 2100-2101.

Deepu, B. R., U. N. Bhatt, and P. Savitha. An analysis of wet anisotropic etching based bulk micromachining for the fabrication of Si tips. in 2016 3rd International Conference on Emerging Electronics (ICEE). 2016.

Zhou, X., Y. Hou, and J. Lin, A review on the processing accuracy of two-photon polymerization. AIP Advances, 2015. 5(3): p. 030701.

Israelachvili, J. N., Intermolecular and surface forces. 2011: Academic press.

Faria, E. C., et al., Measurement of elastic properties of prostate cancer cells using AFM. Analyst, 2008. 133(11): p. 1498-1500.

Hamaker, H., The London—van der Waals attraction between spherical particles. physica, 1937. 4(10): p. 1058-1072.

Garcia, R. and R. Perez, Dynamic atomic force microscopy methods. Surface science reports, 2002. 47(6-8): p. 197-301.

Butt, H.-J., B. Cappella, and M. Kappl, Force measurements with the atomic force microscope: Technique, interpretation and applications. Surface Science Reports, 2005. 59(1): p. 1-152.

Sokolov, I., Atomic force microscopy in cancer cell research. Cancer nanotechnology, 2007. 1: p. 1-

Haviland, D. B., Quantitative force microscopy from a dynamic point of view. Current Opinion in Colloid & Interface Science, 2017. 27: p. 74-81.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A multipurpose scanning microscopy probe, comprising:
   a probe holder;
   a cantilever connected to the probe holder; and
   a scanning microscopy probe tip connected to the cantilever, wherein the probe tip is a three-dimensional geometry, and wherein the probe tip is a 3D printed part.

2. The probe of claim 1, wherein the probe holder and the cantilever are 3D printed parts.

3. The probe of claim 1, wherein the probe holder, the cantilever, and the probe tip are 3D printed as a single part.

4. The probe of claim 1, wherein the probe comprises at least one material selected from the group consisting of SU8 epoxy-based resin, photoresist, polymers, and a nanomaterial.

5. The probe of claim 4, wherein the nanomaterial comprises at least one material selected from the group consisting of carbon nanotubes, nanorods, biomolecules and nanoparticles.

6. The probe of claim 5, wherein the nanomaterial is embedded in the probe tip.

7. The probe of claim 1, wherein the probe tip is post-processed via at least one process selected from the group consisting of a focused ion beam etching, a chemical vapor deposition, a sputtering, and a reactive ion etching.

8. The probe of claim 1, wherein the probe tip includes a hemispherical cavity.

9. The probe of claim 1, wherein the probe comprises at least one shape selected from the group consisting of a conical, a spring, a high aspect ratio, a spherical, a cylindrical, a dimple, a hooked, a shovel, a flat, and a colloidal shape.

10. The probe of claim 1, wherein the probe tip includes at least one aperture and at least one fluidic element, wherein the at least fluidic element comprises at least one shape selected from the group consisting of a mesofluidic channel, a microfluidic channel, a nanofluidic channel, a straight channel, a serpentine channel, a filter, a chamber, a shape varying fluidic element, a 3D fluidic element, and a cross-sectional shape varying fluidic element, and wherein the at least one aperture comprises at least one shape selected from the group consisting of a circular shape, an oval shape, a rectangular shape, and a crescent shape.

11. The probe of claim 1, wherein the cantilever comprises at least one shape selected from the group consisting of a T-shape, a rectangular shape, and L-shape, a trapezoidal shape, a variable-width shape, a triangular shape, and a variable cross-sectional shape, wherein the variable cross-sectional shape comprises at least one shape selected from the group consisting of a rectangular shape, a trapezoidal shape, a triangular shape, and a curved shape.

12. The probe of claim 1, wherein the cantilever is configured to accept at least one probe tip of varying shapes.

13. The probe of claim 1, wherein the probe is coated with a layer comprising at least one material selected from the group consisting of a metal, a polymer, and a biological material.

14. A multipurpose scanning microscopy probe production method, comprising:
   providing a 3D printed scanning microscopy probe design comprising a probe holder, a cantilever connected to the probe holder, and a scanning microscopy probe tip connected to the cantilever, wherein the probe tip is a three-dimensional geometry; and
   3D printing a scanning microscopy probe.

15. The method of claim 14, wherein the probe is 3D printed from at least one material selected from the group consisting of polymers, SU8 epoxy-based resin, and photoresist.

16. The method of claim 14, further comprising dipping the probe into a nanomaterial population to embed the nanomaterial in the probe while the probe is in a cured or a semi-cured state.

17. The method of claim 14, wherein the probe is 3D printed using 2-photon 3D printing.

18. The method of claim 14, wherein the probe design includes at least one aperture and at least one fluidic element.

19. The method of claim 14, further comprising post-processing the probe via at least one process selected from the group consisting of a focused ion beam etching, a chemical vapor deposition, a sputtering, and a reactive ion etching.

20. A scanning microscopy method, comprising:
   providing a 3D printed scanning microscopy probe comprising a probe holder, a cantilever connected to the probe holder, and a scanning microscopy probe tip connected to the cantilever, wherein the probe tip is a three-dimensional geometry; and
   performing a scanning microscopy operation with the 3D printed probe, wherein the scanning microscopy operation comprises at least one process selected from the group consisting of scanning probe microscopy (SPM), atomic force microscopy (AFM), profilometry, nanoindentation, nano-injection, nano-aspiration, nano-manipulation, micro-manipulation, nano-fluidic sampling and micro-fluidic sampling.

* * * * *